United States Patent
Ranganathan et al.

(10) Patent No.: US 11,638,052 B2
(45) Date of Patent: Apr. 25, 2023

(54) METHODS, APPARATUS, AND ARTICLES OF MANUFACTURE TO IDENTIFY CANDIDATES FOR MEDIA ASSET QUALIFICATION

(71) Applicant: The Nielsen Company (US), LLC, New York, NY (US)

(72) Inventors: Raghuram Ranganathan, Tampa, FL (US); David Howell Wright, Safety Harbor, FL (US); James Petro, Dunedin, FL (US); Daniel Nelson, Tampa, FL (US); Deborah Cross, Troy, AL (US)

(73) Assignee: The Nielsen Company (US), LLC, New York, NY (US)

( * ) Notice: Subject to any disclaimer, the term of this patent is extended or adjusted under 35 U.S.C. 154(b) by 53 days.

(21) Appl. No.: 17/334,274

(22) Filed: May 28, 2021

(65) Prior Publication Data

US 2022/0385961 A1    Dec. 1, 2022

(51) Int. Cl.
*H04N 21/24* (2011.01)
*H04N 21/442* (2011.01)

(52) U.S. Cl.
CPC ... *H04N 21/2407* (2013.01); *H04N 21/44204* (2013.01)

(58) Field of Classification Search
CPC .............. H04N 21/2407; H04N 21/44204
See application file for complete search history.

(56) References Cited

U.S. PATENT DOCUMENTS

| | | | |
|---|---|---|---|
| 4,757,241 A | * | 7/1988 | Young ................ H02P 6/14 318/599 |
| 5,481,294 A | | 1/1996 | Thomas et al. |
| 6,606,744 B1 | | 8/2003 | Mikurak |
| 6,671,818 B1 | | 12/2003 | Mikurak |

(Continued)

FOREIGN PATENT DOCUMENTS

EP         1010098 B1    6/2003

OTHER PUBLICATIONS

International Searching Authority, "International Search Report and Written Opinion," issued in connection with International Application No. PCT/US2022/028821, dated Aug. 22, 2022, 8 pages.

(Continued)

*Primary Examiner* — Robert J Hance
(74) *Attorney, Agent, or Firm* — Hanley, Flight & Zimmerman, LLC

(57) ABSTRACT

Methods, apparatus, systems, and articles of manufacture are disclosed to identify candidates for media asset qualification. Example apparatus disclosed herein include a media creditor to determine whether to credit a first media asset to linear media or non-linear media, the non-linear media including subscription video on demand (SVOD). Disclosed example apparatus also include a media asset candidate controller to: classify the first media asset as a non-candidate for media asset qualification in response to the first media asset being credited to the linear media or the non-linear media. In some examples, the media asset candidate controller is to determine whether to classify the first media asset as a candidate for media asset qualification based on whether the first media asset remains uncredited by the media creditor and the first media asset overlaps a streaming period.

20 Claims, 7 Drawing Sheets

(56) References Cited

U.S. PATENT DOCUMENTS

| | | |
|---|---|---|
| 7,124,101 B1 | 10/2006 | Mikurak |
| 7,130,807 B1 | 10/2006 | Mikurak |
| 7,630,986 B1 | 12/2009 | Herz et al. |
| 7,917,439 B2 | 3/2011 | Barnes, Jr. |
| 8,510,770 B1* | 8/2013 | Oztaskent ............... H04H 60/56 |
| | | 709/201 |
| 8,611,919 B2 | 12/2013 | Barnes, Jr. |
| 8,755,837 B2 | 6/2014 | Rhoads et al. |
| 8,868,448 B2 | 10/2014 | Freishtat et al. |
| 9,117,217 B2 | 8/2015 | Wilson et al. |
| 9,202,224 B2 | 12/2015 | Kilar et al. |
| 10,536,757 B2 | 1/2020 | Borawski et al. |
| 2003/0065805 A1 | 4/2003 | Barnes, Jr. |
| 2003/0229900 A1 | 12/2003 | Reisman |
| 2004/0064351 A1 | 4/2004 | Mikurak |
| 2004/0107125 A1 | 6/2004 | Guheen et al. |
| 2005/0166233 A1 | 7/2005 | Beyda et al. |
| 2006/0178918 A1 | 8/2006 | Mikurak |
| 2007/0116037 A1 | 5/2007 | Moore |
| 2008/0222734 A1 | 9/2008 | Redlich et al. |
| 2009/0172773 A1 | 7/2009 | Moore |
| 2010/0257052 A1 | 10/2010 | Zito et al. |
| 2013/0054820 A1 | 2/2013 | Reisman |
| 2013/0278631 A1 | 10/2013 | Border et al. |
| 2014/0337880 A1* | 11/2014 | Sorbel ................... H04N 21/812 |
| | | 725/34 |
| 2015/0363420 A1 | 12/2015 | Garland et al. |
| 2016/0381436 A1* | 12/2016 | Yu ...................... H04N 21/2187 |
| | | 725/19 |
| 2018/0279005 A1* | 9/2018 | Grover ............... H04N 21/6587 |
| 2019/0037257 A1* | 1/2019 | Nelson ............ H04N 21/25891 |
| 2019/0075371 A1* | 3/2019 | Parampath ....... H04N 21/26241 |
| 2019/0075372 A1* | 3/2019 | Parampath ......... H04N 21/4826 |
| 2020/0053416 A1 | 2/2020 | Maltar et al. |
| 2020/0092515 A1* | 3/2020 | Stern ................ H04N 21/43635 |
| 2020/0112754 A1 | 4/2020 | Nelson et al. |
| 2020/0204877 A1* | 6/2020 | Maughan ........... H04N 21/2407 |
| 2020/0322658 A1* | 10/2020 | Shah .................. H04N 21/8358 |
| 2021/0127149 A1 | 4/2021 | Stokes et al. |

OTHER PUBLICATIONS

Oostveen et al., "Feature Extraction and a Database Strategy for Video Fingerprinting," Visual 2002, Lecture Notes in Computer Science 2314, pp. 117-128, 2002, 12 pages.

* cited by examiner

METHODS, APPARATUS, AND ARTICLES OF MANUFACTURE TO IDENTIFY CANDIDATES FOR MEDIA ASSET QUALIFICATION

FIELD OF THE DISCLOSURE

This disclosure relates generally to monitoring media, and, more particularly, to methods, apparatus, and articles of manufacture to identify candidates for media asset qualification.

BACKGROUND

In recent years, methods of accessing media have evolved. For example, in the past, media was primarily accessed via televisions coupled to set-top boxes. Recently, media services deployed via Over-The-Top (OTT) devices or internet streaming capable devices, such as an Amazon Kindle Fire™, an Apple TV®, a Roku® media player, etc., have been introduced that allow users to request and present media on the OTT devices. Such OTT devices, as well as other media presentation platforms, such as desktop, laptop, and handheld mobile devices (e.g., smartphones, tablets, etc.) enable exposure to media from a variety of content providers and content publishers.

BRIEF DESCRIPTION OF THE DRAWINGS

FIG. 2 is a block diagram of an example implementation of the central facility of

FIG. 1.

Figure 1:
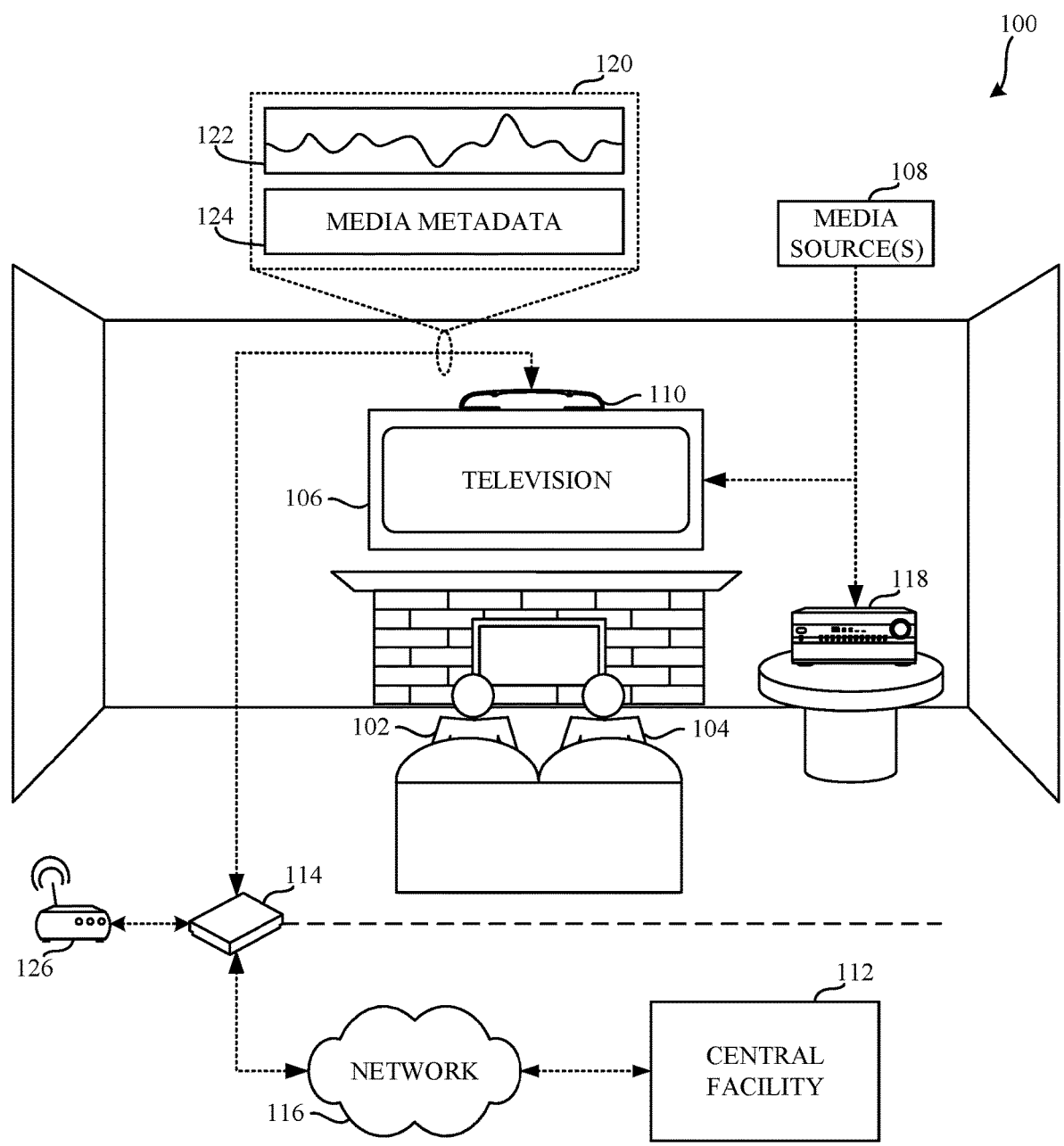
FIG. 1 is a block diagram of an example media presentation environment constructed in accordance with the teachings of this disclosure to generate media assets for qualification to be stored in a media reference database.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially" refers quantities that are essentially the same allowing for minor differences between the quantities that account for real world errors due to computing time, transmission, etc.

DETAILED DESCRIPTION

Many entities have an interest in understanding how users are exposed to media on the Internet. For example, an audience measurement entity (AME) desires knowledge on how users interact with media devices such as smartphones, tablets, laptops, smart televisions, etc. In particular, an example AME may want to monitor media presentations made at the media devices to, among other things, monitor exposure to advertisements, determine advertisement effectiveness, determine user behavior, identify purchasing behavior associated with various demographics, etc.

AMEs coordinate with advertisers to obtain knowledge regarding an audience of media. For example, advertisers are interested in knowing the composition, engagement, size, etc. of an audience for media. For example, media (e.g., audio and/or video media) may be distributed by a media distributor to media consumers. Content distributors, advertisers, content producers, etc. have an interest in knowing the size of an audience for media from the media distributor, the extent to which an audience consumes the media, whether the audience pauses, rewinds, fast forwards the media, etc. As used herein the term "content" includes programs, advertisements, clips, shows, etc. As used herein, the term "media" includes any type of content and/or advertisement delivered via any type of distribution medium. As used herein "media" refers to audio and/or visual (still or moving) content and/or advertisements. Thus, media includes television programming or advertisements, radio programming or advertisements, movies, web sites, streaming media, etc.

AMEs monitor audience members to obtain knowledge regarding the audience of media. To facilitate such monitoring, AMEs enlist panelists and install meters at the media presentation locations of those panelists. The meters monitor media presentations and transmit media monitoring information to a central facility of the AME. Such media monitoring information enables the AME to, among other things, monitor exposure to advertisements, determine advertisement effectiveness, determine user behavior, identify purchasing behavior associated with various demographics, etc.

In some instances, AMEs identify media by extracting information such as signatures or media identifiers such as codes, watermarks, etc., and comparing them to reference information. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component.

In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, signature-based media monitoring techniques (also referred to as fingerprint-based media monitoring techniques) generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched with the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas et al., U.S. Pat. No. 5,481,294, which is hereby incorporated by reference in its entirety.

Example methods, apparatus, and articles of manufacture disclosed herein monitor media presentations at media devices. Such media devices may include, for example, Internet-enabled televisions, personal computers (e.g., desktop computers, laptop computers, etc.), Internet-enabled mobile handsets (e.g., a smartphone), video game consoles (e.g., Xbox®, PlayStation®), tablet computers (e.g., an iPad®), digital media players (e.g., an Apple TV®, an Amazon Kindle Fire™, a Roku® media player, a Slingbox®, etc.), etc.

In examples disclosed herein, a central facility associated with an AME obtains one or more media assets from a meter. Example media assets include one or more monitored signatures and corresponding media metadata. As used herein, the term "media asset" refers to any type of information extracted from media presented at a media device or otherwise collected in association with the presentation of such media, which may include one or more monitored signatures and/or media metadata including one or more media identifiers such as one or more codes, one or more watermarks, etc. As used herein, the term "media metadata" refers to any type of media related information that includes a source identifier, a stream identifier, a passive audio signature (PAS) timestamp, a duration of media, a media identifier, etc., and/or a combination thereof.

Example meters disclosed herein transmit one or more media assets to the central facility at the end of a predefined period. In some examples, the example meters disclosed herein transmit one or more media assets to the central facility every five minutes. In additional or alternative examples, the example meters disclosed herein transmit one or more media assets to the central facility at the end of each day (e.g., the end of each 24-hour period). In other examples, meters may transmit media assets to the central facility periodically or a-periodically. In some examples, an example media asset includes a collection of two or more monitored signatures from a media device that individually and/or collectively identifies media from which the monitored signatures were obtained. For example, the media asset may be a sequence of two or more monitored signatures obtained from a meter operating on an OTT device monitoring a presentation of the Home Box Office (HBO) content "Game of Thrones" on the OTT device. In another example, the meter may be operating externally to the OTT device. In such an example, the media asset may be a sequence of two or more monitored signatures obtained from a media meter, a people meter, a portable personal meter, such as one carried by a panelist on their person, etc., monitoring a presentation of the media.

Based on the media asset(s) and other monitoring information obtained from at least one meter, the central facility credits media assets to media presented linearly and/or non-linearly. For example, the central facility credits a media asset to media by identifying the media that was presented when the media asset was generated. As used herein, the term "linear" refers to media provided via a live feed. For example, linear media programming includes a catalog of stations where each station includes a schedule of programs (e.g., shows) selected by a broadcaster and presented at set times. As used herein, the term "non-linear" refers to media with which a consumer can interact, for example, to select media to consume (e.g., to view and/or listen) at a time chosen by the consumer. For example, non-linear media is often consumed via subscription video on demand (SVOD) services such as Netflix®, Hulu®, Disney+®, Starz®, Amazon Video Direct®, Amazon Instant Video®, YouTube®, and Vimeo® but can also be consumed via free to use version of such services. Non-linear media also includes on demand services offered by cable providers and other media providers. Non-linear media can also refer to time-shifted media in which the media was recorded, paused, and then played back. As used herein, the term "tuning period" refers to a period during which an audience member is exposed to credited media.

For example, linear tuning periods are often 30 minutes in length and categorized by positions in a 24-hour period. Typically, linear tuning periods include sign on, early morning news, early morning, late morning, daytime television, early fringe, lunchtime news, early afternoon, late afternoon, early evening, evening news, prime time, late-night news, late night television, graveyard slot, sign-off (sometimes referred to as closedown), late fringe, and post late-fringe, the meaning of which will be clear to one of ordinary skill in the art. Each tuning period may correspond to a particular period that is relative to the location in which media is being monitored (e.g., sign on in Chicago, Ill. may correspond to Coordinated Universal Time (UTC)−5 h whereas sign on in Bangalore, India may correspond to UTC+5.5 h).

While linear tuning periods are somewhat constant (e.g., the sign on tuning period tends to start and end at the same time each day) and media presented therein is presented via a live feed that is often scheduled, non-linear tuning periods are less constant, and media presented therein is unpredictable. The lack of constant non-linear tuning periods with predictable programming is due, in part, to the flexibility non-linear media offers to consumers to select which media they want to consume and when they want to consume the media. Additionally, whereas linear tuning periods are often 30 minutes in length, non-linear tuning periods may be a fraction of that time (e.g., five minutes of a Hulu® show while a consumer is commuting to the office) or much longer (e.g., a three-hour binge of a new show that recently released on Netflix®).

Another difference between linear media and non-linear media is that linear media (e.g., linear media associated with a client of the AME) is often supplemented with one or more media identifiers such as codes, watermarks, etc. whereas non-linear media may lack such media identifiers. Some non-linear media (e.g., non-linear media associated with a client of the AME) includes one or more media identifiers, but such identifiers may be absent from other non-linear media. Thus, identifying non-linear media may be difficult if such media identifiers are absent. Accordingly, crediting media assets to non-linear media presents difficulty as the tuning periods are indeterminant in length, unpredictable in content, and media presented therein may not include media identifiers.

To overcome the issues presented by crediting non-linear media, the example central facility disclosed herein maintains a media reference database for non-linear media (e.g., non-linear media lacking one or more media identifiers). Because SVOD is one of the most common types of media presented non-linearly, the media reference database disclosed herein includes multiple reference media assets for SVOD media. However, examples disclosed herein are not limited to SVOD and may applied to other non-linear media or other media of interest.

To populate the media reference database, the example central facility collects candidate media assets from meters and evaluates the candidates for storage as a reference media asset that represents the media (e.g., SVOD) associated with the media asset. Additionally, to reduce the computational burden associated with qualifying reference media assets for the media reference database, the example central facility disclosed herein filters candidate media assets to only evaluate those media assets that are not currently stored in the media reference database. Because SVOD is often streamed, examples disclosed herein additionally reduce the computational burden associated with qualifying reference media assets by evaluating only those media assets that were generated during periods when media was streamed.

For example, the example central facility disclosed herein first credits media assets to media including one or more media identifiers (e.g., linear media and/or non-linear media associated with a client of an AME). After crediting media assets to media including one or more media identifiers, the example central facility compares remaining uncredited media assets to reference media assets in the media reference database. Any remaining media assets that are not credited to linear media or non-linear media represented by reference media assets in the media reference database correspond to unidentified media for which the central facility does not have a reference media asset in the media reference database.

However, not all the unidentified media assets correspond to SVOD or other media of interest. For example, playback of a recording of the Cable-Satellite Public Affairs Network (C-SPAN) corresponds to a non-linear tuning period, but the C-SPAN recording does not correspond to SVOD. To identify which of these media assets corresponds to SVOD, the example central facility identifies which of the remaining uncredited media assets was generated during periods of streaming. A media asset that was generated during a period of streaming can be said to overlap with the streaming period. Because SVOD is generally consumed via streaming, media assets that overlap with streaming periods have a higher probability of corresponding to SVOD than those that do not.

As such, the example central facility ignores the unidentified media assets that do not overlap with streaming periods to reduce the computational burden associated with forming the media reference database. For example, by filtering out media assets that have previously been credited and those media assets that do not overlap with streaming periods, the central facility reduces the overall processing cycles consumed to qualify media assets, the bandwidth consumed to transmit media assets between components of the central facility, the energy consumed to qualify media assets, etc. The example candidate asset identification and subsequent qualification described herein may be repeated at the end of the day (e.g., the end of each 24-hour period). As such, examples disclosed herein continually and efficiently accelerate non-linear reference media asset qualification by qualifying media assets and updating the media reference database automatically, every day, when crediting for meters is completed, making the non-linear reference media asset qualification event based.

FIG. 1 is a block diagram of an example media presentation environment 100 constructed in accordance with the teachings of this disclosure to generate media assets for qualification to be stored in a media reference database. The example media presentation environment 100 includes example panelists 102, 104, an example media presentation device 106 that receives media from an example media source(s) 108, and an example media presentation meter 110 that monitors the media presented via the media presentation device 106. The media presentation meter 110 identifies the media presented by the media presentation device 106 and reports media monitoring information to an example central facility 112 of an example AME via an example gateway 114 and an example network 116.

In the illustrated example of FIG. 1, the example media presentation environment 100 is a room of a household (e.g., a room in a home of a panelist, such as the home of a "Nielsen family"). In the illustrated example of FIG. 1, the example panelists 102, 104 of the household have been statistically selected to develop media ratings data (e.g., television ratings data) for a population/demographic of interest. People become panelists via, for example, a user interface presented on a media device (e.g., via the media presentation device 106, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 102, 104 of the household have registered with an AME (e.g., by agreeing to be a panelist) and have provided their demographic information to the AME as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 100 is a household in the illustrated example of FIG. 1, the example media presentation environment 100 can additionally or alternatively be any other type(s) of environments such as, for example, a theater, a restaurant, a tavern, a retail location, an arena, etc.

In the illustrated example of FIG. 1, the example media presentation device 106 is a television. For example, the media presentation device 106 is implemented by an Internet-enabled television capable of presenting media (e.g., via an integrated display and speakers, etc.) streaming from an OTT device. However, the example media presentation device 106 can correspond to any type of audio, video and/or multimedia presentation device capable of presenting media audibly and/or visually. In the illustrated example of FIG. 1, the media presentation device 106 is in communication with an example audio/video receiver 118.

In some examples, the media presentation device 106 (e.g., a television) may communicate audio to another media presentation device (e.g., the audio/video receiver 118) for output by one or more speakers (e.g., surround sound speakers, a sound bar, etc.). As another example, the media presentation device 106 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 102, 104). While in the illustrated example one media presentation device is shown, any number of media presentation devices may be used.

The media presentation device 106 receives media from the media source(s) 108. The media source(s) 108 may be any type of media provider(s), such as, but not limited to, a cable media service provider, a radio frequency (RF) media provider, an Internet based provider (e.g., Internet Protocol Television (IPTV)), a satellite media service provider, etc., and/or any combination thereof. The media may be radio media, television media, pay per view media, movies, IPTV, satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand (e.g., SVOD), etc. For example, the media presentation device 106 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source(s) 108, etc., is also typically included in the media.

In examples disclosed herein, an AME provides the media presentation meter 110 to the panelist 102, 104 (or household of panelists) such that the media presentation meter 110 may be installed by the panelist 102, 104 by powering the media presentation meter 110 and placing the media presentation meter 110 in the media presentation environment 100 and/or near the media presentation device 106 (e.g., near a television set). In some examples, the media presentation meter 110 may be provided to the panelist 102, 104 by an entity other than the AME. In some examples, more complex installation activities may be performed such as, for example, affixing the media presentation meter 110 to the media presentation device 106, electronically connecting the media presentation meter 110 to the media presentation device 106, etc.

In the illustrated example of FIG. 1, the media presentation meter 110 detects exposure to media and electronically stores media monitoring information (e.g., a code detected with the presented media, a monitored signature of the presented media, an identifier of a panelist present at the time of the presentation, a timestamp of the time of the presentation) of the presented media. In the example of FIG. 1, the media presentation meter 110 generates one or more media assets. For example, the media presentation meter 110 generates an example media asset 120 based on the media provided by the media source(s) 108. In the example of FIG. 1, the media presentation meter 110 is implemented, in part, by a processor executing machine-readable instructions.

In the illustrated example of FIG. 1, the media presentation meter 110 generates the media asset 120 based on at least a portion of the media monitoring information. For example, the media asset 120 includes an example monitored signature 122 and example media metadata 124. In the illustrated example, the monitored signature 122 includes one or more audio-based signatures. Additionally or alternatively, the monitored signature 122 may include one or more video-based signatures and/or any other type of signature based on media identification information (e.g., media identifiers, etc.). In the illustrated example, the media metadata 124 includes media identifiers corresponding to the media provided by the media source(s) 108. For example, the media presentation meter 110 may determine that the monitored signature 122 corresponds to the presentation of Season 7 Episode 1 of "Game of Thrones" based on analyzing the media identifier stored in the media metadata 124, where the media identifier was extracted from the audio of the media provided by the media source(s) 108. However, as described above, in some examples (e.g., when the media does not include a media identifier), the media metadata 124 may not include a media identifier.

In the example illustrated in FIG. 1, the media presentation meter 110 transmits the stored media monitoring information (e.g., including the media asset 120) to the central facility 112 via the gateway 114 and the network 116. While the media monitoring information is transmitted electronically, other forms of transmission are possible. For example, at least one of the panelists 102, 104 may by physically mail the media presentation meter 110 to the AME to transfer the media monitoring information. In some examples, at least one of the panelists 102, 104 may physically mail a memory of the media presentation meter 110 to the AME to transfer the media monitoring information. Other forms of transmitting the media monitoring information are possible.

In the illustrated example of FIG. 1, the media monitoring information includes media identifying information and people data. For example, media identifying information and/or data includes one or more of at least one signature, at least one fingerprint, at least one code, tuned channel identification information, and time of exposure information, among others. Example people data includes one or more of at least one user identifier, demographic data associated with at least one audience member, among others. The media identifying information and the people data can be combined (e.g., by the central facility 112) to generate, for example, media exposure data (e.g., ratings data) indicative of amount(s) and/or type(s) of people that were exposed to specific piece(s) of media distributed via the media presentation device 106. To extract media identification data, the media presentation meter 110 of the illustrated example of FIG. 1 monitors for watermarks (sometimes referred to as codes) included in the presented media.

In examples disclosed herein, to monitor media presented by the media presentation device 106, the media presentation meter 110 of the illustrated example senses audio (e.g., acoustic signals or ambient audio) output (e.g., emitted) by the media presentation device 106 and/or some other audio presenting system (e.g., the audio/video receiver 118 of FIG. 1). For example, the media presentation meter 110 processes the signals obtained from the media presentation device 106 to detect media and/or source identifying signals (e.g., audio watermarks) embedded in portion(s) (e.g., audio portions) of the media presented by the media presentation device 106. To, for example, sense ambient audio output by the media presentation device 106, the media presentation meter 110 of the illustrated example includes multiple example audio sensors (e.g., microphone(s) and/or other acoustic sensors). In some examples, the media presentation meter 110 may process audio signals obtained from the media presentation device 106 via a direct cable connection to detect media and/or source identifying audio watermarks embedded in such audio signals.

The effectiveness of an audio sensor to recognize a watermark can depend on the position (e.g., forward-facing or rear-facing) of the audio sensor and/or the position (e.g., forward-facing or rear-facing) of the audio source (e.g., speaker). Accordingly, in examples disclosed herein, audio sensor(s) of the media presentation meter 110 are selected to facilitate the best possible watermark recognition. Different configurations of audio sensor(s) of the media presentation meter 110 may be used to, for example, account for different acoustic environments resulting in different recognition levels of watermarks, account for differently configured audio systems, and account for different configurations being used based on a selected input to the media presentation device 106.

In some examples, the media presentation meter 110 can be physically coupled to the media presentation device 106 and/or may be configured to capture audio emitted externally by the media presenting device 106 (e.g., free field audio) such that direct physical coupling to an audio output of the media presenting device 106 is not required. For example, the media presentation meter 110 of the illustrated example may employ non-invasive monitoring involving no physical connection to the media presentation device 106 (e.g., acoustic watermarking, for example) and/or invasive monitoring involving one or more physical connections to the media presentation device 106 (e.g., via Universal Serial Bus (USB) connection, a High Definition Media Interface (HDMI) connection, an Ethernet cable connection, etc.). In some examples, invasive monitoring may be used to facilitate a determination of which audio sensor(s) should be used by the media presentation meter 110. For example, based on the speaker configuration of the media presentation device 106 as identified by the media presentation meter 110 via a USB connection with the media presentation device 106, the media presentation meter 110 may select the appropriate audio sensor(s) best suited for monitoring the audio output by the media presentation device 106.

In some examples, one or more media presentation meters may be provided by the AME in addition to or as an alternative to the media presentation meter 110. For example, an alternative media presentation meter may be coupled between the media presentation device 106 and devices providing media to the media presentation device 106 (e.g., an OTT device, for example). The alternative media presentation meter may operate similarly to the media presentation meter 110 and may be implemented, in part, by, for example, a processor executing machine-readable instructions.

The alternative media presentation meter also monitors media output from the media presentation device 106, another media presentation device (e.g., the audio/video receiver 118), and/or one or more speakers (e.g., surround sound speakers, a sound bar, etc.). For example, the alternative media presentation meter monitors the audio and/or video signals output by the media presentation device 106, the other media presentation device (e.g., the audio/video receiver 118), and/or the one or more speakers (e.g., surround sound speakers, a sound bar, etc.). By comparing the output of the devices providing media to the media presentation device 106 to the media output from the media presentation device 106, the other media presentation device (e.g., the audio/video receiver 118), and/or the one or more speakers (e.g., surround sound speakers, a sound bar, etc.), the alternative media presentation meter can determine the device providing the media to the media presentation device 106. This functionality may be referred to herein as source device detection capability.

In the example of FIG. 1, the gateway 114 is implemented by a router that enables the media presentation meter 110 and/or other devices in the media presentation environment (e.g., the media presentation device 106) to communicate with the network 116 (e.g., the Internet). In some examples, the example gateway 114 facilitates delivery of media from the media source(s) 108 to the media presentation device 106 via the Internet. In some examples, the example gateway 114 includes gateway functionality such as modem capabilities. In some other examples, the example gateway 114 is implemented in two or more devices (e.g., a router, a modem, a switch, a firewall, etc.). The gateway 114 of the illustrated example may communicate with the network 116 via Ethernet, a digital subscriber line (DSL), a telephone line, a coaxial cable, a USB connection, a Bluetooth connection, any wireless connection, etc.

In some examples, the example gateway 114 hosts a Local Area Network (LAN) for the media presentation environment 100. In the illustrated example, the LAN is a wireless local area network (WLAN), and allows the media presentation meter 110, the media presentation device 106, etc. to transmit and/or receive data via the Internet. Additionally or alternatively, the gateway 114 may be coupled to such a LAN. In some examples, the example gateway 114 is implemented by a cellular communication system and may, for example, enable the media presentation meter 110 to transmit information to the central facility 112 using a cellular connection.

In examples disclosed herein, the AME also provides an example streaming meter 126 to the panelist 102, 104 (or household of panelists) such that the streaming meter 126 may be installed by the panelist 102, 104 by powering the streaming meter 126 and connecting the streaming meter 126 to the gateway 114 via a physical connection (e.g., Ethernet, USB, etc.). The streaming meter 126 can also be connected to the gateway 114 and/or other devices in the media presentation environment 100 wirelessly.

For example, the streaming meter 126 of the illustrated example may employ non-invasive monitoring involving no physical connection to the gateway 114 and/or other devices in the media presentation environment 100 (e.g., via Bluetooth® connection, WIFI® connection, etc.). In some examples, the streaming meter 126 may be provided to the panelist 102, 104 by an entity other than the AME. In some examples, more complex installation activities may be performed. By connecting to the network hosted by the gateway 114, the streaming meter 126 measures streaming information which can be used to determine whether the panelists 102, 104 are streaming media to the media presentation device 106. For example, the panelists 102, 104 may be streaming media to the media presentation device 106 via a video game console or an Internet streaming device such as an OTT device. In some examples, the media presentation device 106 may be implemented as a smart TV that can stream media directly without the need for another device.

In the illustrated example of FIG. 1, the streaming meter 126 is implemented, in part, by a processor executing machine-readable instructions. In the example of FIG. 1, the streaming meter 126 identifies Internet activity of devices on the network hosted by the gateway 114. For example, the streaming meter 126 identifies Internet activity which includes Uniform Resource Locators (URLs) accessed over the network, media access control (MAC) addresses of devices that accessed the URLs, domain names, bandwidth consumed by devices (e.g., identified by MAC addresses) accessing the Internet, etc. Based on the Internet activity (e.g., the bandwidth consumed by a device (e.g., identified by a MAC address) accessing the Internet and/or a URL visited by the device (e.g., identified by the MAC address)), the streaming meter 126 identifies periods during which media was being streamed over the network hosted by the gateway 114 (e.g., streaming periods).

For example, if a device is consuming high bandwidth, the device may be streaming media. To verify that the high bandwidth consumption corresponds a streaming period, the streaming meter 126 determines whether one or more URLs accessed by the device during the period of high bandwidth consumption are associated with a streaming source (e.g., Netflix®, Hulu®, etc.). If the streaming meter 126 determines that one or more URLs accessed by the device during the period of high bandwidth consumption are associated with a streaming source, the streaming meter 126 identifies the timestamps at which the high bandwidth starts and ends and categorizes the period therebetween as a streaming period associated with the MAC address of the device that accessed the media. Additionally or alternatively, the streaming meter 126 may evaluate whether the respective domain names of one or more websites are associated with a streaming source.

In the illustrated example of FIG. 1, the streaming meter 126 transmits the streaming information (e.g., streaming periods, URLs and/or domain names accessed during the streaming period, MAC addresses of devices accessing the URLs and/or domain names, etc.) to the central facility 112 via the gateway 114 and the network 116. For example, the streaming meter 126 transmits the streaming information to the central facility 112 at periodic intervals, scheduled intervals, aperiodic intervals, and/or one-time events. In some examples, the streaming meter 126 transmits the streaming information to the media presentation meter 110 and/or one or more additional or alternative media presentation meters. In such examples, the media presentation meter 110 and/or one or more additional or alternative media presentation meters transmit media monitoring information and the streaming information to the central facility 112. In additional or alternative examples, the media presentation meter 110 and/or one or more additional or alternative media presentation meters transmit media monitoring information to the streaming meter 126. In such examples, the streaming meter 126 transmits the streaming information and the media monitoring information to the central facility 112.

As described above, the media presentation meter 110 transmits the media asset 120 and/or other media assets to central facility 112 that include respective monitored signatures and respective media metadata. Additionally, the streaming meter 126 transmits the streaming information to the central facility 112 via the gateway 114 and the network 116. In the illustrated example of FIG. 1, the network 116 is implemented by a wide area network (WAN) such as the Internet. However, the example network 116 may be implemented using any suitable wired and/or wireless network(s) including, for example, one or more data buses, one or more LANs, one or more WLANs, one or more cellular networks, one or more private networks, one or more public networks, one or more cable networks, etc., or any combination thereof. The example network 116 enables the media presentation device 106, the media presentation meter 110, the streaming meter 126, etc., to be in communication with the central facility 112.

In the illustrated example of FIG. 1, the central facility 112 coordinates an identification, a selection, etc., of a media asset to be stored in a media (e.g., SVOD) reference database for measuring and/or reporting by an AME. To improve media asset qualification, the central facility 112 mines meter data from the media presentation meter 110 to intelligently determine the periods and associated monitored signatures from the media assets generated by the media presentation meter 110 that have the highest probability of being candidates for the media asset qualification process. For example, before qualifying media assets to be stored in the media reference database, the central facility 112 credits media assets obtained from the media presentation meter 110 and/or other media presentation meters to non-linear media already accounted for in the media reference database and/or linear media. If media assets are credited to non-linear media already accounted for in the media reference database and/or linear media, the central facility 112 classifies those media assets as non-candidates for qualification and disregards the media assets.

In the illustrated example of FIG. 1, before qualifying media assets to be stored in the media reference database, the central facility 112 additionally determines whether any remaining media assets overlap with streaming periods (e.g., determined from the streaming information obtained from the streaming meter 126). If any remaining media assets do not overlap with streaming periods, the central facility 112 classifies those media assets as non-candidates for qualification and disregards the media assets. In other words, the central facility 112 classifies those remaining media assets that overlap with streaming periods as candidates for qualification and qualifies the candidates for storage in the media reference database.

In some examples, the central facility 112 implements means for media asset qualification. The means for media asset qualification is implemented by executable instructions such as that implemented by at least blocks 302, 304, 306, 308, 310, 312, 314, 316, 318, 320, 322, 324, 326, and 328 of FIG. 3 and/or at least blocks 402, 404, 406, 408, 410, and 412 of FIG. 4 and/or at least blocks 502, 504, 506, 508, 510, 512, 514, 516, 518, and 520 of FIG. 5. The executable instructions of blocks 302, 304, 306, 308, 310, 312, 314, 316, 318, 320, 322, 324, 326, and 328 of FIG. 3 and/or blocks 402, 404, 406, 408, 410, and 412 of FIG. 4 and/or blocks 502, 504, 506, 508, 510, 512, 514, 516, 518, and 520 of FIG. 5 may be executed on at least one processor such as the example processor 612 of FIG. 6. In other examples, the means for media asset qualification is implemented by hardware logic, hardware implemented state machines, logic circuitry, and/or any other combination of hardware, software, and/or firmware.

Figure 2:
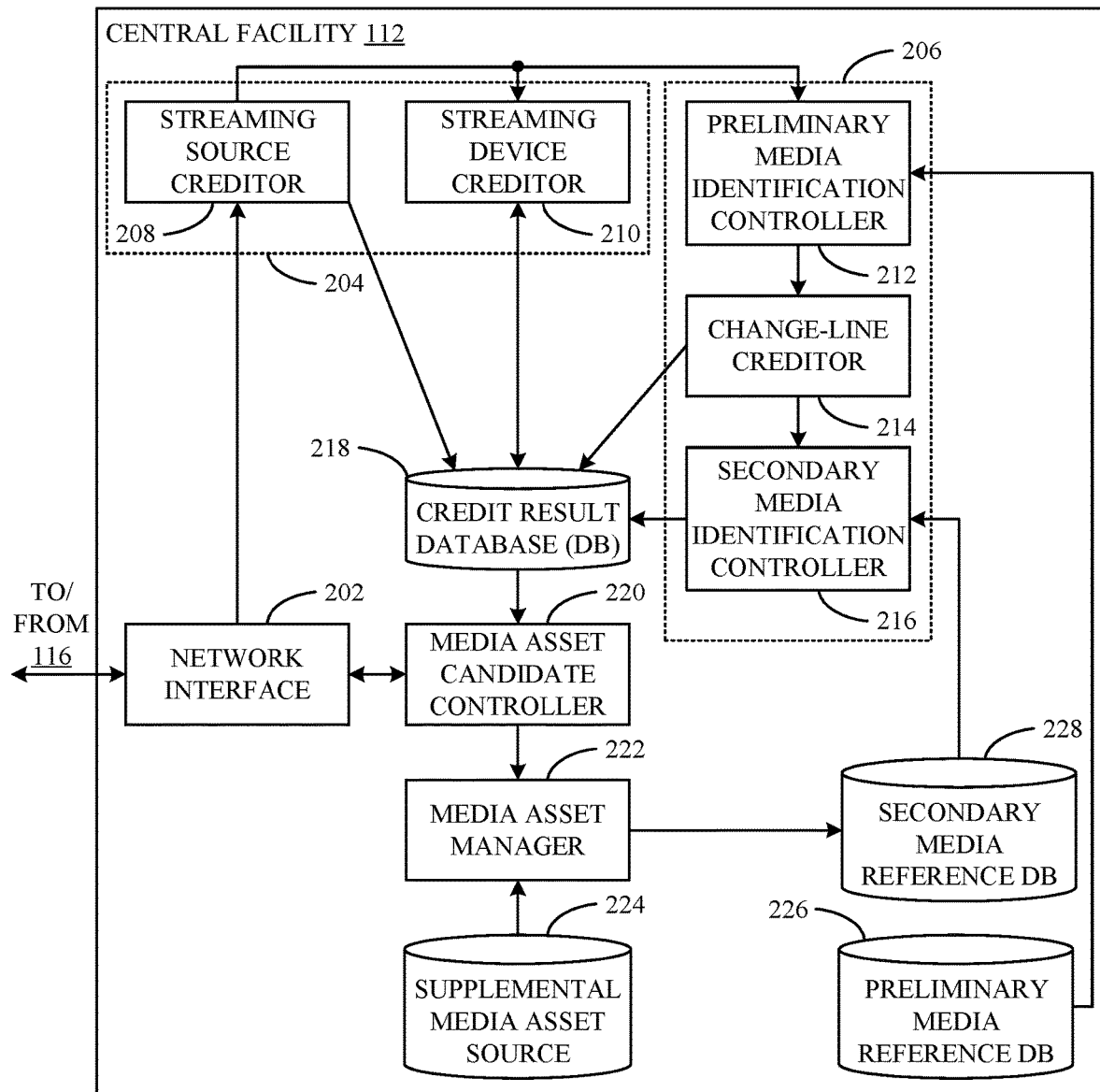

FIG. 2 is a block diagram of an example implementation of the example central facility 112 of FIG. 1. In the example of FIG. 2, the central facility 112 includes an example network interface 202, an example streaming creditor 204, and an example media creditor 206. In the example of FIG. 2, the streaming creditor 204 includes an example streaming source creditor 208 and an example streaming device creditor 210. In the example of FIG. 2, the media creditor 206 includes an example preliminary media identification controller 212, an example change-line creditor 214, and an example secondary media identification controller 216. The central facility 112 also includes an example credit result database 218, an example media asset candidate controller 220, an example media asset manager 222, an example supplemental media asset source 224, an example preliminary media reference database 226, and an example secondary media reference database 228.

In the illustrated example of FIG. 2, the network interface 202 is implemented by a web server that receives and/or otherwise obtains media assets (e.g., the media asset 120) from media devices and/or meters (e.g., the media presentation meter 110). Additionally, the network interface 202 receives and/or otherwise obtains streaming information from streaming meters (e.g., the streaming meter 126). In the example of FIG. 2, the network interface 202 is coupled to the network 116 to obtain media assets and streaming information. The network interface 202 is additionally coupled to the streaming source creditor 208 (e.g., the streaming creditor 204) and the media asset candidate controller 220.

In the illustrated example of FIG. 2, the network interface 202 forwards media assets and streaming information to the streaming source creditor 208. The network interface 202 additionally forwards one or more media assets to the media asset candidate controller 220. In the example of FIG. 2, the information included in the media assets (e.g., the media asset 120) and/or the streaming information is formatted as an HTTP message. However, any other message format and/or protocol may additionally or alternatively be used such as, for example, a file transfer protocol (FTP), a simple message transfer protocol (SMTP), an HTTP secure (HTTPS) protocol, etc. In some examples, the network interface 202 determines whether to continue monitoring a media device. For example, the network interface 202 may determine that the media presentation device 106 of FIG. 1 is not presenting media, is not powered on, etc.

In some examples, the network interface 202 implements means for interfacing. The means for interfacing is implemented by executable instructions such as that implemented by at least blocks 302 and 328 of FIG. 3. The executable instructions of blocks 302 and 328 of FIG. 3 may be executed on at least one processor such as the example processor 612 of FIG. 6. In other examples, the means for interfacing is implemented by hardware logic, hardware implemented state machines, logic circuitry, and/or any other combination of hardware, software, and/or firmware.

In the illustrated example of FIG. 2, the streaming creditor 204 is implemented by one or more processors executing machine-readable instructions. In the example of FIG. 2, the streaming creditor 204 is coupled to the network interface 202, the media creditor 206, and the credit result database 218. In the example of FIG. 2, the streaming creditor 204 is configured to determine one or more streaming periods based on the streaming information obtained by the network interface 202. For example, the streaming creditor 204 identifies the one or more streaming periods identified by the streaming meter 126 and included in the streaming information. Additionally, the streaming creditor 204 is configured to determine the media source (e.g., Netflix®, Hulu®, Disney+®, etc.) that streamed the media during the one or more identified streaming periods as well as one or more devices (e.g., registered devices) registered with the central facility 112 (e.g., an AME) to which the media was streamed during the one or more identified streaming periods. Additional detail with respect to the structure and operation of the streaming creditor 204 is discussed in connection with the streaming source creditor 208 and the streaming device creditor 210.

In some examples, the streaming creditor 204 implements means for crediting streaming. The means for crediting streaming is implemented by executable instructions such as that implemented by at least blocks 304 and 306 of FIG. 3 and/or at least blocks 402, 404, 406, 408, 410, and 412 of FIG. 4. The executable instructions of blocks 304 and 306 of FIG. 3 and/or blocks 402, 404, 406, 408, 410, and 412 of FIG. 4 may be executed on at least one processor such as the example processor 612 of FIG. 6. In other examples, the means for crediting streaming is implemented by hardware logic, hardware implemented state machines, logic circuitry, and/or any other combination of hardware, software, and/or firmware.

In the illustrated example of FIG. 2, the media creditor 206 is implemented by one or more processors executing machine-readable instructions. In the example of FIG. 2, the media creditor 206 is coupled to the streaming creditor 204, the credit result database 218, the preliminary media reference database 226, and the secondary media reference database 228. In the example of FIG. 2, the media creditor 206 is configured to determine whether one or more media assets corresponds to linear media and/or non-linear media. Additional detail with respect to the structure and operation of the media creditor 206 is discussed in connection with the preliminary media identification controller 212, the changeline creditor 214, and the secondary media identification controller 216.

In some examples, the media creditor 206 implements means for crediting media. The means for crediting media is implemented by executable instructions such as that implemented by at least block 308 of FIG. 3 and/or at least blocks 502, 504, 506, 508, 510, 512, 514, 516, 518, and 520 of FIG. 5. The executable instructions of block 308 of FIG. 3 and/or blocks 502, 504, 506, 508, 510, 512, 514, 516, 518, and 520 of FIG. 5 may be executed on at least one processor such as the example processor 612 of FIG. 6. In other examples, the means for crediting media is implemented by hardware logic, hardware implemented state machines, logic circuitry, and/or any other combination of hardware, software, and/or firmware.

In the illustrated example of FIG. 2, the streaming creditor 204 includes the streaming source creditor 208. The example streaming source creditor 208 is implemented by a processor executing machine-readable instructions. In the example of FIG. 2, the streaming source creditor 208 is coupled to the network interface 202, the streaming device creditor 210, the preliminary media identification controller 212 (e.g., the media creditor 206), and the credit result database 218. In the example of FIG. 2, the streaming source creditor 208 receives one or more media assets and streaming information from the network interface 202. After processing the one or more media assets and/or streaming information, the streaming source creditor 208 forwards the one or more media assets and streaming information to the streaming device creditor 210 and the preliminary media identification controller 212.

In the illustrated example of FIG. 2, the streaming source creditor 208 is configured to determine the media source (e.g., Netflix®, Hulu®, Disney+®, etc.) that streamed the media during the one or more identified streaming periods. For example, the streaming source creditor 208 identifies the one or more streaming periods identified by the streaming meter 126 and included in the streaming information. Additionally, for each streaming period identified, the streaming source creditor 208 determines the identity of the media source that streamed media (e.g., the streaming media source) during the streaming period. For example, the streaming source creditor 208 determines the identities (e.g., Netflix®, Hulu®, Disney+®, etc.) of streaming media sources by comparing the URLs and/or domain names accessed during the streaming periods to reference URLs and/or domain names that are indicative of the streaming media sources. In some examples, the streaming source creditor 208 determines the source of the media without identifying the device to which it is being streamed. The streaming device creditor 210 determines the device to which the streaming media is being sent, as described below.

By determining the identity of the streaming media source, the streaming source creditor 208 allows the media asset manager 222 to target the asset qualification process towards assets from specific streaming providers. For example, if YouTube® is the streaming media source, then the monitored signatures during that streaming period can be used for qualifying assets from YouTube®. Additionally, for example, by knowing the streaming media source (e.g., Netflix®), the media asset manager 222 may ignore those media assets from different streaming media sources (e.g., Vimeo®) during the media asset qualification process. In this manner, knowing the streaming media source reduces the processing burden (e.g., reduces the input data size, reduces the number of computational cycles consumed, reduces the energy consumed, etc.) for qualifying media assets.

Additionally or alternatively, knowing the streaming media source may allow the media asset manager 222 to supplement media assets from one streaming media source with media assets from another streaming media source. For example, media may be proprietary to one streaming media source (e.g., Stranger Things® is only available on Netflix® at the time of this writing), but clips of the media may be available from other streaming media sources (e.g., clips from Stranger Things® are available on YouTube®). In some examples, media may be available from multiple streaming media sources (e.g., Schitt's Creek is available on Netflix® and Hulu® at the time of this writing) and knowing the streaming media source may allow the media asset manager 222 to utilize media assets generated based on media from one streaming media source with media assets generated based on media from another streaming media source. After determining the one or more streaming periods and the identity of the streaming media sources, the streaming source creditor 208 stores identifiers of the streaming periods and associated streaming media sources in the credit results database 218.

In some examples, the streaming source creditor 208 implements means for crediting streaming sources. The means for crediting streaming sources is implemented by executable instructions such as that implemented by at least block 304 of FIG. 3 and/or at least blocks 402, 404, 410, and 412 of FIG. 4. The executable instructions of block 304 of FIG. 3 and/or blocks 402, 404, 410, and 412 of FIG. 4 may be executed on at least one processor such as the example processor 612 of FIG. 6. In other examples, the means for crediting streaming sources is implemented by hardware logic, hardware implemented state machines, logic circuitry, and/or any other combination of hardware, software, and/or firmware.

In the illustrated example of FIG. 2, the streaming creditor 204 includes the streaming device creditor 210. The example streaming device creditor 210 is implemented by a processor executing machine-readable instructions. In the example of FIG. 2, the streaming device creditor 210 is coupled to the streaming source creditor 208, the preliminary media identification controller 212 (e.g., the media creditor 206), and the credit result database 218. In the example of FIG. 2, the streaming device creditor 210 receives one or more media assets and/or streaming information from the streaming source creditor 208. Additionally or alternatively, the streaming device creditor 210 may access identifiers of the streaming periods and associated streaming media sources from the credit results database 218.

In the illustrated example of FIG. 2, the streaming device creditor 210 is configured to identify the device to which media was streamed during the identified streaming period(s). For example, for each streaming period, the streaming device creditor 210 is configured to determine whether a MAC address of a device that accessed media during the streaming period matches a MAC address of a registered device. In the example of FIG. 2, the streaming device creditor 210 maintains a record of media devices (e.g., registered devices) associated with a media presentation environment and MAC addresses associated therewith. For example, the media presentation device 106 and the audio/video receiver 118 are registered devices associated with the media presentation environment 100. Additionally, any other media devices may be registered devices including Internet-enabled televisions, personal computers (e.g., desktop computers, laptop computers, etc.), Internet-enabled mobile handsets (e.g., a smartphone), video game consoles (e.g., Xbox®, PlayStation®), tablet computers (e.g., an iPad®), digital media players (e.g., an Apple TV®, an Amazon Kindle Fire™, a Roku® media player, a Slingbox®, etc.), etc. In some examples, the streaming device creditor 210 determines the device to which media was streamed without determining the source (e.g., Netflix®, Hulu®, Disney+®, etc.) of the streaming media.

In the illustrated example of FIG. 2, in response to determining that a MAC address of a device that accessed media during a streaming period matches a MAC address of a registered device, the streaming device creditor 210 credits the streaming period to the registered device. In response to determining that a MAC address of a device that accessed media during a streaming period does not match a MAC address of a registered device, the streaming device creditor 210 does not credit the streaming period to a registered device. After determining the registered devices that accessed media during the streaming periods and crediting the streaming periods with the registered devices, the streaming device creditor 210 stores identifiers of the streaming periods and credited registered devices in the credit results database 218.

In some examples, a media asset may be generated by a meter with source device detection capability. As described above, source device detection capability corresponds to the capability of a media presentation meter to determine the device providing media to a media presentation device (e.g., the media presentation device 106) by comparing the output of one or more devices providing media to the media presentation device to media output from the media presentation device, another media presentation device, and/or one or more speakers. In some such examples, the streaming device creditor 210 compares the identity of the device that was streaming media as determined via the MAC address and the identity of the device that was streaming media as determined via source device detection capability. If the streaming device creditor 210 determines that the identity of the device that was streaming media as determined via the source device detection capability does not match the identity of the device that was streaming media as determined via the MAC address, the streaming device creditor 210 defers to the identity of the device that was streaming media as determined via the source device detection capability. If the identity of the device that was streaming media as determined via source device detection capability does not match the identity of a registered device, the streaming device creditor 210 does not credit the streaming period to a registered device.

In some examples, the streaming device creditor 210 implements means for crediting streaming devices. The means for crediting streaming devices is implemented by executable instructions such as that implemented by at least blocks 406 and 408 of FIG. 4. The executable instructions of blocks 406 and 408 of FIG. 4 may be executed on at least one processor such as the example processor 612 of FIG. 6. In other examples, the means for crediting streaming devices is implemented by hardware logic, hardware implemented state machines, logic circuitry, and/or any other combination of hardware, software, and/or firmware.

In the illustrated example of FIG. 2, the media creditor 206 includes the preliminary media identification controller 212. The example preliminary media identification controller 212 is implemented by a processor executing machine-readable instructions. In the example of FIG. 2, the preliminary media identification controller 212 is coupled to the streaming source creditor 208, the streaming device creditor 210, the change-line creditor 214, and the preliminary media reference database 226. In the example of FIG. 2, the preliminary media identification controller 212 receives one or more media assets and/or streaming information from the streaming source creditor 208.

In the illustrated example of FIG. 2, the preliminary media identification controller 212 is configured to determine the identity of media from which the one or media assets were generated. For example, the preliminary media identification controller 212 is configured to determine whether the one or more media assets are associated with a media identifier. In response to determining that a media asset is associated with a media identifier, the preliminary media identification controller 212 identifies the media from which the media asset was generated based on the media identifier. While in most cases non-linear media will not include a media identifier, in some cases non-linear media will include such identifiers. In such cases, the preliminary media identification controller 212 will identify the non-linear media based on the media identifier(s).

In the illustrated example of FIG. 2, in response to determining that a media asset is not associated with a media identifier, the preliminary media identification controller 212 determines whether a monitored signature of the media asset matches a reference signature in the preliminary media reference database 226 maintained by the central facility 112. As described below, the preliminary media reference database 226 stores reference signatures of media associated with clients of the AME. For example, the reference signatures of the media associated with clients of the AME may be generated from media provided by the clients to the AME such that the AME can generate one or more reference signatures prior to, in parallel with, and/or after the release of the media to the general public. In response to determining that the monitored signature of the media asset matches a reference signature in the preliminary media reference database 226, the preliminary media identification controller 212 identifies the media from which the monitored signature was generated based on the reference signature. In response to determining that the monitored signature of the media asset does not match a reference signature in the preliminary media reference database 226, the preliminary media identification controller 212 forwards the monitored signature and corresponding media asset to the secondary media identification controller 216 (e.g., via the change-line creditor 214).

In some examples, the preliminary media identification controller 212 implements means for identifying preliminary media. The means for identifying preliminary media is implemented by executable instructions such as that implemented by at least blocks 502, 504, 506, 510, 512, 518, and 520 of FIG. 5. The executable instructions of blocks 502, 504, 506, 510, 512, 518, and 520 of FIG. 5 may be executed on at least one processor such as the example processor 612 of FIG. 6. In other examples, the means for identifying preliminary media is implemented by hardware logic, hardware implemented state machines, logic circuitry, and/or any other combination of hardware, software, and/or firmware.

In the illustrated example of FIG. 2, the media creditor 206 includes the change-line creditor 214. The example change-line creditor 214 is implemented by a processor executing machine-readable instructions. In the example of FIG. 2, the change-line creditor 214 is coupled to the preliminary media identification controller 212, the secondary media identification controller 216, and the credit result database 218. In the example of FIG. 2, the change-line creditor 214 receives the identity of media from which the one or media assets were generated as determined by the preliminary media identification controller 212. Additionally, the change-line creditor 214 forwards the monitored signatures that do not match a reference signature in the preliminary media reference database 226 and/or are not associated with a media identifier (and corresponding media assets) to the secondary media identification controller 216.

In the illustrated example of FIG. 2, the change-line creditor 214 is configured to credit media assets to media identified by the preliminary media identification controller 212. In other words, the change-line creditor 214 is configured to associate the corresponding media assets with the media identified by the preliminary media identification controller 212. In the example of FIG. 2, the change-line creditor 214 credits media assets at a station level. That is, if the preliminary media identification controller 212 identified that a media asset corresponds to HBO content, such as Season 7 Episode 1 of "Game of Thrones," the change-line creditor 214 credits the media asset to HBO. In additional or alternative examples, the change-line creditor 214 may credit media assets at a program level (e.g., credits the media asset to Season 7 Episode 1 of HBO's "Game of Thrones"). In either case, the change-line creditor 214, maintains change-lines for media devices associated with media assets. In example disclosed herein, a change-line represents change in a device, such as the stations and/or programs to which a user tuned the device. After crediting media assets with linear media, the change-line creditor 214 stores identifiers of the credited media assets in the credit results database 218. Additionally or alternatively, the change-line creditor 214 stores one or more change-lines in the credit results database 218.

In some examples, the change-line creditor 214 implements means for crediting linear media. The means for crediting linear media is implemented by executable instructions such as that implemented by at least block 508 of FIG. 5. The executable instructions of block 508 of FIG. 5 may be executed on at least one processor such as the example processor 612 of FIG. 6. In other examples, the means for crediting linear media is implemented by hardware logic, hardware implemented state machines, logic circuitry, and/or any other combination of hardware, software, and/or firmware.

In the illustrated example of FIG. 2, the media creditor 206 includes the secondary media identification controller 216. The example secondary media identification controller 216 is implemented by a processor executing machine-readable instructions. In the example of FIG. 2, the secondary media identification controller 216 is coupled to the change-line creditor 214, the credit result database 218, and the secondary media reference database 228. In the example of FIG. 2, the secondary media identification controller 216 receives the monitored signatures that do not match a reference signature in the preliminary media reference database 226 and/or are not associated with a media identifier from the change-line creditor 214. In this manner, the secondary media identification controller 216 matches those monitored signatures that overlap with uncredited tuning periods in the change-line credit result. As such, the processing burden of the secondary media identification controller 216 is reduced such that the secondary media identification controller 216 evaluates only those periods for which secondary media of interest (e.g., SVOD) can be credited (e.g., SVOD is not credited during periods of station crediting (e.g., the change-line credit result)).

In the illustrated example of FIG. 2, the secondary media identification controller 216 is configured to determine the identity of media from which one or more media assets were generated that do not match a reference signature in the preliminary media reference database 226 and/or do not include a media identifier. In the example of FIG. 2, in response to the preliminary media identification controller 212 determining that a monitored signature does not match a reference signature in the preliminary media reference database 226, the secondary media identification controller 216 determines whether the monitored signature matches a reference signature in the secondary media reference database 228. As described below, the secondary media reference database 228 stores reference signatures of media that is not associated with clients of the AME and/or otherwise not available to the AME other than through the general public. In the example of FIG. 2, the secondary media reference database 228 includes media assets associated with SVOD. However, in additional or alternative examples, the secondary media reference database 228 includes media assets associated with any other media of interest.

In the illustrated example of FIG. 2, in response to determining that the monitored signature matches a reference signature in the secondary media reference database 228, the secondary media identification controller 216 credits the associated media asset to the media associated with the reference signature. In response to determining that the monitored signature does not match a reference signature in the secondary media reference database 228, the secondary media identification controller 216 does not credit the media asset associated to the media from which the monitored signature was generated. In the example of FIG. 2, the secondary media identification controller 216 credits media assets at a program level. That is, if the secondary media identification controller 216 identified that a media asset corresponds to HBO content, such as Season 7 Episode 1 of "Game of Thrones," the secondary media identification controller 216 credits the media asset to Season 7 Episode 1 of HBO's "Game of Thrones." After crediting media assets with media of interest (e.g., SVOD), the secondary media identification controller 216 stores identifiers of the credited media assets in the credit results database 218.

In some examples, the secondary media identification controller 216 implements means for identifying secondary media. The means for identifying secondary media is implemented by executable instructions such as that implemented by at least blocks 514 and 516 of FIG. 5. The executable instructions of blocks 514 and 516 of FIG. 5 may be executed on at least one processor such as the example processor 612 of FIG. 6. In other examples, the means for identifying secondary media is implemented by hardware logic, hardware implemented state machines, logic circuitry, and/or any other combination of hardware, software, and/or firmware.

In the illustrated example of FIG. 2, the central facility 112 includes the credit result database 218 to record data (e.g., preliminary crediting results (e.g., linear tuning periods, linear crediting results, etc.), secondary crediting results (e.g., SVOD crediting results), streaming periods, whether a media asset corresponds to a streaming period, etc.). In the illustrated example, the credit result database 218 is a database storing the crediting results determined by the streaming creditor 204 and the media creditor 206. In this manner, the media asset candidate controller 220 can determine which media assets have not been credited and overlap with streaming periods.

In the illustrated example of FIG. 2, the credit result database 218 may be implemented by a volatile memory (e.g., a Synchronous Dynamic Random-Access Memory (SDRAM), Dynamic Random-Access Memory (DRAM), RAMBUS Dynamic Random-Access Memory (RDRAM), etc.) and/or a non-volatile memory (e.g., flash memory). The credit result database 218 may additionally or alternatively be implemented by one or more double data rate (DDR) memories, such as DDR, DDR2, DDR3, DDR4, mobile DDR (mDDR), etc. The credit result database 218 may additionally or alternatively be implemented by one or more mass storage devices such as hard disk drive(s), compact disk drive(s), digital versatile disk drive(s), solid-state disk drive(s), etc.

While in the illustrated example the credit result database 218 is illustrated as a single database, the credit result database 218 may be implemented by any number and/or type(s) of databases. Furthermore, the data stored in the credit result database 218 may be in any data format such as, for example, binary data, comma delimited data, tab delimited data, structured query language (SQL) structures, etc. Alternatively, the credit result database 218 may be located externally to the central facility 112.

In the illustrated example of FIG. 2, the media asset candidate controller 220 is implemented by a processor executing machine-readable instructions. In the example of FIG. 2, the media asset candidate controller 220 is coupled to the network interface 202, the credit result database 218, and the media asset manager 222. In the example of FIG. 2, the media asset candidate controller 220 receives one or more media assets from the network interface 202 to determine whether the media assets have been credited and/or whether the media assets overlap with a streaming period.

In the illustrated example of FIG. 2, after preliminary crediting (e.g., linear change-line crediting and/or client non-linear media crediting) and secondary crediting (e.g., SVOD crediting), there may still be uncredited media assets. By combining these uncredited media assets with streaming periods, the media asset candidate controller 220 determines the durations during which there is streaming of non-linear media in a media presentation environment, but no secondary credit result (e.g., SVOD credit result) was obtained. In the example of FIG. 2, the media asset candidate controller 220 is configured to access the credit result database 218 to classify the one or more media assets received from the network interface 202 as candidates or non-candidates for qualification by the media asset manager 222. For example, if a media asset was previously designated as credited in the credit result database 218, the media asset candidate controller 220 classifies the media asset as a non-candidate for qualification and disregards the credited media asset. For any remaining uncredited media assets, the media asset candidate controller 220 determines whether the media assets overlap with streaming periods.

In the illustrated example of FIG. 2, to determine whether a media asset overlaps with a streaming period, the media asset candidate controller 220 compares the timestamps (e.g., at least two timestamps) of the media asset to the timestamps of the streaming period. For example, if the timestamps of a media asset indicates that the media asset covers times between the start timestamp and the end timestamp of the streaming period, the media asset candidate controller 220 determines that the media asset overlaps with the streaming period. In some examples, if the timestamps of the media asset also indicate the media asset covers times within a threshold amount of time after the start timestamp of the streaming period and/or a threshold amount of time after the end timestamp of the streaming period, the media asset candidate controller 220 determines that the media asset overlaps with the streaming period.

For example, in the case of streaming media, before the media is output from a media device (e.g., and before a meter can generate a signature based on the streaming media), the media device may buffer some data representative of the streaming media. Similarly, in such examples, after the streaming period ends (e.g., once the media device has buffered all the data needed to present the streaming media), the media device may continue to output the streaming media that is buffered. Accordingly, in some examples, the media asset candidate controller 220 determines that a media asset overlaps with a streaming period if the media asset covers a period equal to the streaming period but offset by a threshold (e.g., five minutes, ten minutes, etc.).

In the illustrated example of FIG. 2, in response to determining that an uncredited media asset does not overlap with a streaming period, the media asset candidate controller 220 classifies the uncredited media asset as a non-candidate for qualification and disregards the uncredited media asset. In response to determining that an uncredited media asset overlaps with a streaming period, the media asset candidate controller 220 classifies the uncredited media asset as a candidate for qualification. The media asset candidate controller 220 forwards the candidate media assets to the media asset manager 222. If the media asset candidate controller 220 does not classify any media asset as candidate media assets, the media asset candidate controller 220 does not forward any media assets to the media asset manager 222.

In some examples, the media asset candidate controller 220 implements means for classifying media assets. The means for classifying media assets is implemented by executable instructions such as that implemented by at least blocks 310, 312, 314, 316, 318, 320, 322, and 326 of FIG. 3. The executable instructions of blocks 310, 312, 314, 316, 318, 320, 322, and 326 of FIG. 3 may be executed on at least one processor such as the example processor 612 of FIG. 6. In other examples, the means for classifying media assets is implemented by hardware logic, hardware implemented state machines, logic circuitry, and/or any other combination of hardware, software, and/or firmware.

In the illustrated example of FIG. 2, the media asset manager 222 is implemented by a processor executing machine-readable instructions. In the example of FIG. 2, the media asset manager 222 is coupled to the media asset candidate controller 220, the supplemental media asset source 224, and the secondary media reference database 228. In the example of FIG. 2, the media asset manager 222 receives one or more the candidate media assets from the media asset candidate controller 220. Additionally or alternatively, the media asset manager 222 obtains media assets from the supplemental media asset source 224.

In the illustrated example of FIG. 2, the media asset manager 222 is configured to evaluate the candidate media assets identified by the media asset candidate controller 220 for storage in the secondary media reference database 228. For example, the media asset manager 222 manages the secondary media reference database 228 (e.g., a media asset database) based on qualifying one or more of the candidate media assets obtained from the media asset candidate controller 220 as database candidates (e.g., of a quality suitable for reproduction or matching against other media assets). The media asset manager 222 selects qualified candidate media assets for storage in the secondary media reference database 228 and subsequent measuring and/or monitoring by an AME. The media asset manager 222 processes candidate media assets to determine the identify of an asset and/or to supplement a pre-existing media asset.

For example, the media asset manager 222 compares candidate media assets to a threshold time length to determine whether the media assets time length satisfies the threshold. In such an example, the threshold time length corresponds to the length of time of known media. Additionally or alternatively, the media asset manager 222 determines whether a panelist has previously indicated that he or she watched media corresponding to the candidate media asset. In other examples, the media asset manager 222 determines whether the media from which the candidate media asset was generated may be played back at a varied (e.g., increased and/or decreased) rate. To identify the media from which a candidate media asset was generated, the media asset manager 222 compares the candidate media asset to meter information from additional meters. Such meter information identifies the media. Once a candidate media asset is qualified and stored in the secondary media reference database 228, the next time the media from which the candidate media asset was generated is captured by a meter, the media creditor 206 will credit media assets generated therefrom to the media. Example methods and apparatus to perform media asset qualification are disclosed in Nelson et al., U.S. Pat. No. 10,440,413, which is hereby incorporated by reference in its entirety.

In some examples, the media asset manager 222 implements means for qualifying media assets. The means for qualifying media assets is implemented by executable instructions such as that implemented by at least block 324 of FIG. 3. The executable instructions of block 324 of FIG. 3 may be executed on at least one processor such as the example processor 612 of FIG. 6. In other examples, the means for qualifying media assets is implemented by hardware logic, hardware implemented state machines, logic circuitry, and/or any other combination of hardware, software, and/or firmware.

In the illustrated example of FIG. 2, the central facility 112 includes the supplemental media asset source 224 to record data. In the illustrated example, the supplemental media asset source 224 is a media asset database storing reference files of media assets generated by meters implemented as software executing on media devices. In some examples, the supplemental media asset source 224 may be any other type of database.

In the illustrated example of FIG. 2, the supplemental media asset source 224 may be implemented by a volatile memory (SDRAM, DRAM, RDRAM, etc.) and/or a non-volatile memory (e.g., flash memory). The supplemental media asset source 224 may additionally or alternatively be implemented by one or more DDR memories, such as DDR, DDR2, DDR3, DDR4, mDDR, etc. The supplemental media asset source 224 may additionally or alternatively be implemented by one or more mass storage devices such as hard disk drive(s), compact disk drive(s), digital versatile disk drive(s), solid-state disk drive(s), etc.

While in the illustrated example, the supplemental media asset source 224 is illustrated as a single database, the supplemental media asset source 224 may be implemented by any number and/or type(s) of databases. Furthermore, the data stored in the supplemental media asset source 224 may be in any data format such as, for example, binary data, comma delimited data, tab delimited data, SQL structures, etc. Alternatively, the supplemental media asset source 224 may be located externally to the central facility 112.

In the illustrated example of FIG. 2, the central facility 112 includes the preliminary media reference database 226 to record data (e.g., reference media assets and/or reference signatures of media associated with a client of the AME, hash tables, media identification information, matching percentages, grades, rankings, etc.). In the illustrated example, the preliminary media reference database 226 is a media asset database storing reference files of linear media and/or non-linear provided to the AME by clients of the AME. In this manner, incoming media assets can be compared against the reference files in the preliminary media reference database 226 to identify and/or qualify the media assets as media associated with a client of the AME. Alternatively, the preliminary media reference database 226 may be any other type of database.

In the illustrated example of FIG. 2, the preliminary media reference database 226 may be implemented by a volatile memory (SDRAM, DRAM, RDRAM, etc.) and/or a non-volatile memory (e.g., flash memory). The preliminary media reference database 226 may additionally or alternatively be implemented by one or more DDR memories, such as DDR, DDR2, DDR3, DDR4, mDDR, etc. The preliminary media reference database 226 may additionally or alternatively be implemented by one or more mass storage devices such as hard disk drive(s), compact disk drive(s), digital versatile disk drive(s), solid-state disk drive(s), etc.

While in the illustrated example the preliminary media reference database 226 is illustrated as a single database, the preliminary media reference database 226 may be implemented by any number and/or type(s) of databases. Furthermore, the data stored in the preliminary media reference database 226 may be in any data format such as, for example, binary data, comma delimited data, tab delimited data, SQL structures, etc. Alternatively, the preliminary media reference database 226 may be located externally to the central facility 112.

In the illustrated example of FIG. 2, the central facility 112 includes the secondary media reference database 228 to record data (e.g., SVOD media assets, hash tables, media identification information, matching percentages, grades, rankings, etc.). In the illustrated example, the secondary media reference database 228 is a media asset database storing reference files of SVOD media and/or other non-linear media that is not associated with a client of the AME. In this manner, incoming media assets can be compared against the reference files in the secondary media reference database 228 to identify and/or qualify the media assets as SVOD and/or other non-linear media that is not associated with a client of the AME. Alternatively, the secondary media reference database 228 may be any other type of database.

In the illustrated example of FIG. 2, the secondary media reference database 228 may be implemented by a volatile memory (SDRAM, DRAM, RDRAM, etc.) and/or a non-volatile memory (e.g., flash memory). The secondary media reference database 228 may additionally or alternatively be implemented by one or more DDR memories, such as DDR, DDR2, DDR3, DDR4, mDDR, etc. The secondary media reference database 228 may additionally or alternatively be implemented by one or more mass storage devices such as hard disk drive(s), compact disk drive(s), digital versatile disk drive(s), solid-state disk drive(s), etc.

While in the illustrated example the secondary media reference database 228 is illustrated as a single database, the secondary media reference database 228 may be implemented by any number and/or type(s) of databases. Furthermore, the data stored in the secondary media reference database 228 may be in any data format such as, for example, binary data, comma delimited data, tab delimited data, SQL structures, etc. Alternatively, the secondary media reference database 228 may be located externally to the central facility 112.

While an example manner of implementing the central facility 112 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example streaming creditor 204, the example media creditor 206, the example streaming source creditor 208, the example streaming device creditor 210, the example preliminary media identification controller 212, the example change-line creditor 214, the example secondary media identification controller 216, the example credit result database 218, the example media asset candidate controller 220, the example media asset manager 222, the example supplemental media asset source 224, the example preliminary media reference database 226, the example secondary media reference database 228, and/or, more generally, the example central facility 112 of FIGS. 1 and 2 may be implemented by hardware, software, firmware and/or any combination of hardware, software and/or firmware. Thus, for example, any of the example network interface 202, the example streaming creditor 204, the example media creditor 206, the example streaming source creditor 208, the example streaming device creditor 210, the example preliminary media identification controller 212, the example change-line creditor 214, the example secondary media identification controller 216, the example credit result database 218, the example media asset candidate controller 220, the example media asset manager 222, the example supplemental media asset source 224, the example preliminary media reference database 226, the example secondary media reference database 228, and/or, more generally, the example central facility 112 of FIGS. 1 and 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example streaming creditor 204, the example media creditor 206, the example streaming source creditor 208, the example streaming device creditor 210, the example preliminary media identification controller 212, the example change-line creditor 214, the example secondary media identification controller 216, the example credit result database 218, the example media asset candidate controller 220, the example media asset manager 222, the example supplemental media asset source 224, the example preliminary media reference database 226, the example secondary media reference database 228, and/or, more generally, the example central facility 112 of FIGS. 1 and 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 112 of FIGS. 1 and 2 may include one or more elements, processes and/or devices in addition to, or instead of, those illustrated in FIG. 2, and/or may include more than one of any or all of the illustrated elements, processes, and devices. As used herein, the phrase "in communication," including variations (e.g., secure or non-secure communications, compressed or non-compressed communications, etc.) thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
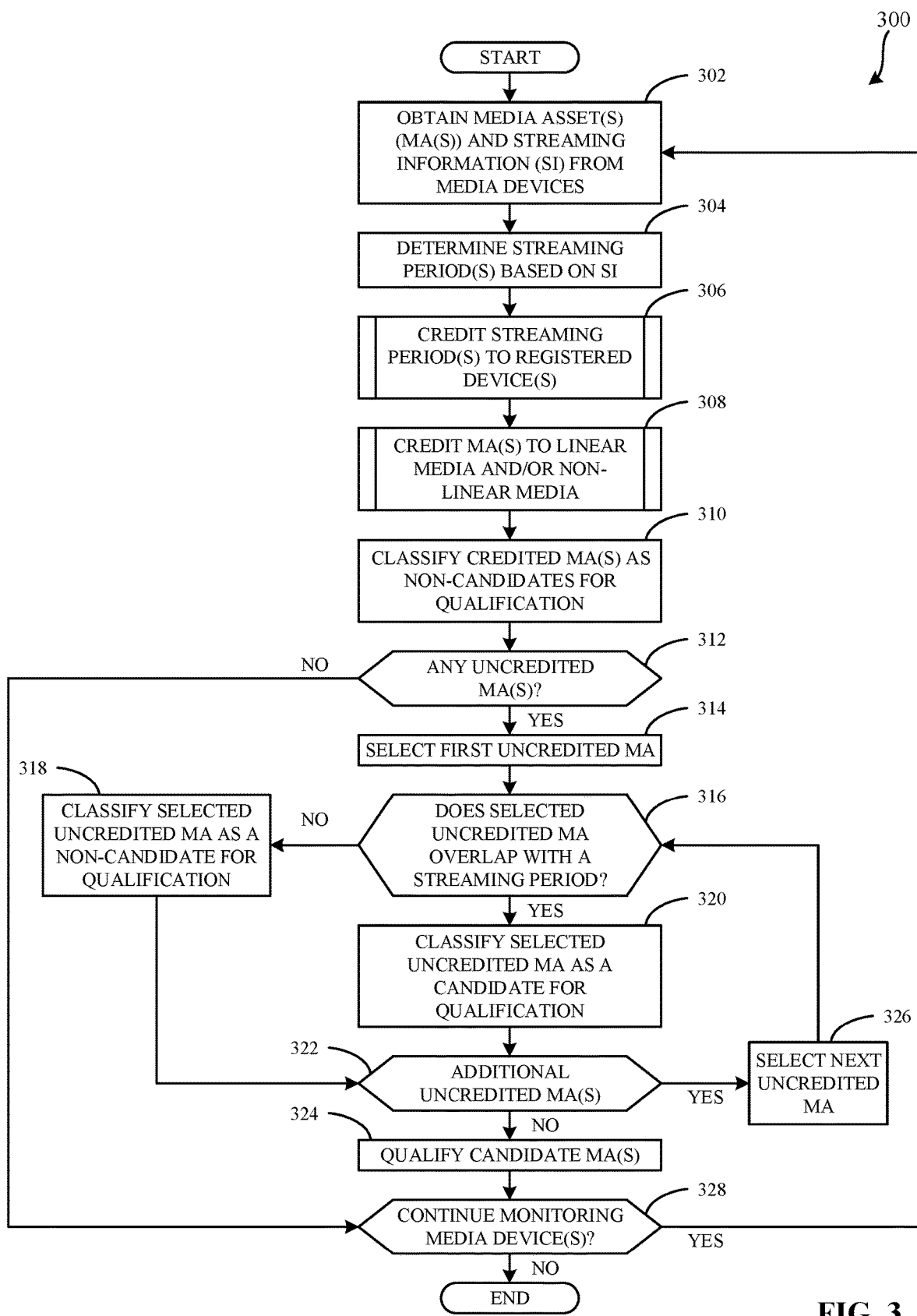
FIG. 3 is a flowchart representative of example machine-readable instructions which may be executed to implement the central facility of FIGS. 1 and 2 to identify candidate media assets for qualification to be stored in the media reference database.
Figure 4:
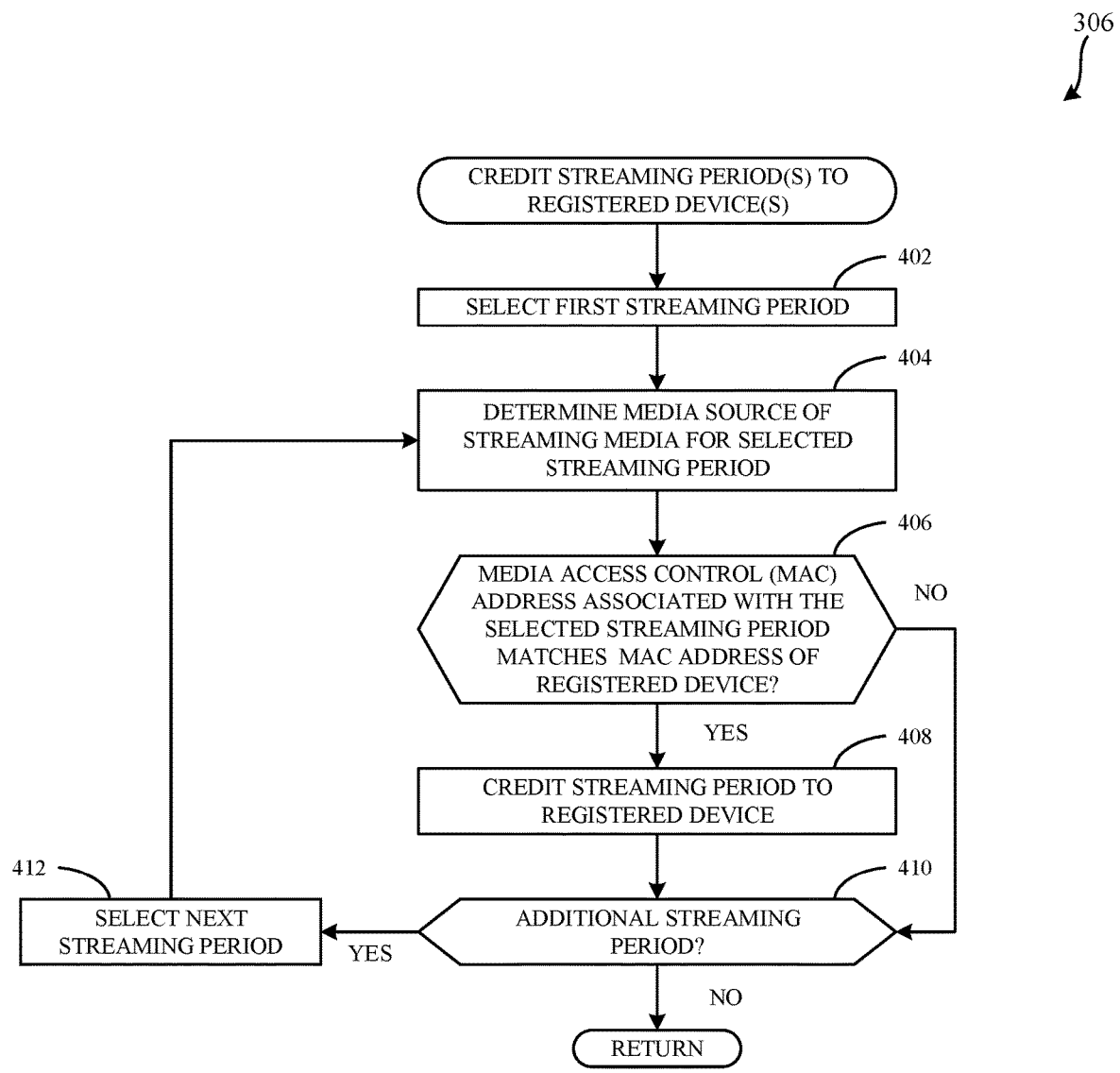
FIG. 4 is a flowchart representative of example machine-readable instructions which may be executed to implement the central facility of FIGS. 1 and 2 to credit one or more streaming periods to one or more registered devices.
Figure 5:
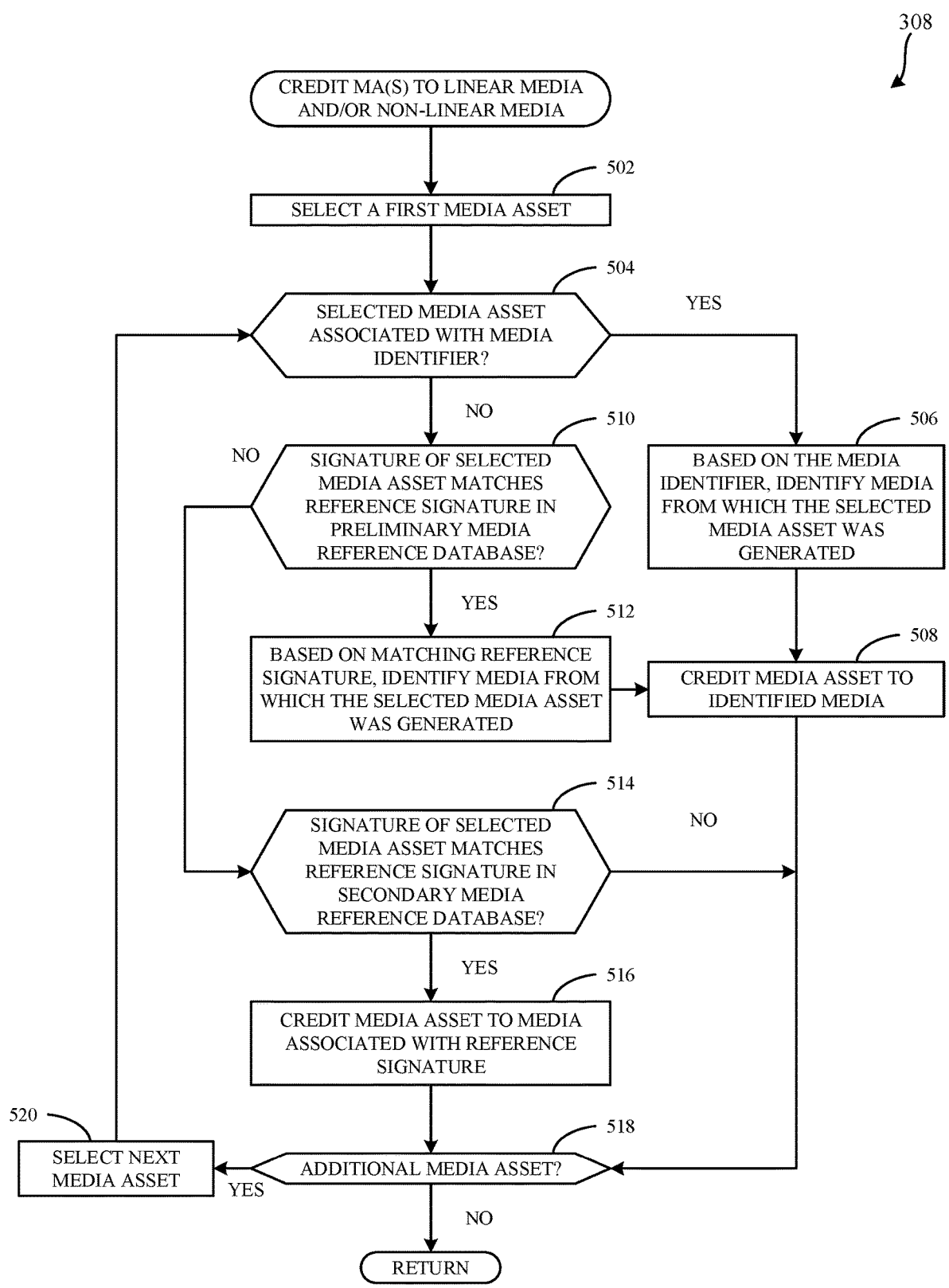
FIG. 5 is a flowchart representative of example machine-readable instructions which may be executed to implement the central facility of FIGS. 1 and 2 to credit one or more media assets to linear media and/or non-linear media.

Flowcharts representative of example hardware logic, machine-readable instructions, hardware implemented state machines, and/or any combination thereof for implementing the central facility 112 of FIGS. 1 and 2 are shown in FIGS. 3, 4, and 5. The machine-readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3, 4, and 5 many other methods of implementing the example central facility 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, and 5 may be implemented using executable instructions (e.g., computer and/or machine-readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions 300 which may be executed to implement the central facility 112 of FIGS. 1 and 2 to identify candidate media assets for qualification to be stored in the secondary media reference database 228. The machine-readable instructions 300 begin at block 302 where the network interface 202 obtains one or more media assets (e.g., the media asset 120) from media devices and/or meters (e.g., the media presentation meter 110) and streaming information from streaming meters (e.g., the streaming meter 126). At block 304, the streaming source creditor 208, and/or, more generally, the streaming creditor 204, determines one or more streaming periods based on the streaming information.

In the illustrated example of FIG. 3, at block 306, the streaming creditor 204 credits one or more streaming periods to one or more registered devices. Detailed example machine-readable instructions to credit one or more streaming periods to one or more registered devices are illustrated and described in connection with FIG. 4. At block 308, the media creditor 206 credits one or more media assets to linear media and/or non-linear media. Detailed example machine-readable instructions to credit one or more media assets to linear media and/or non-linear media are illustrated and described in connection with FIG. 5.

In the illustrated example of FIG. 3, at block 310, the media asset candidate controller 220 classifies one or more media assets that were credited in the credit result database 218 as non-candidates for qualification and disregards the credited media asset. At block 312, the media asset candidate controller 220 determines whether there are any uncredited media assets. In response to the media asset candidate controller 220 determining that there are not any uncredited media assets (block 312: NO), the machine-readable instructions 300 proceed to block 328. In response to the media asset candidate controller 220 determining that there are uncredited media assets (block 312: YES), the machine-readable instructions 300 proceed to block 314.

In the illustrated example of FIG. 3, at block 314, the media asset candidate controller 220 selects a first one of the one or more uncredited media assets. At block 316, the media asset candidate controller 220 determines whether the selected uncredited media asset overlaps with a streaming period. In response to the media asset candidate controller 220 determining that an uncredited media asset does not overlap with a streaming period (block 316: NO), the machine-readable instructions 300 proceed to block 318. In response to the media asset candidate controller 220 determining that an uncredited media asset overlaps with a streaming period (block 316: YES), the machine-readable instructions 300 proceed to block 320.

In the illustrated example of FIG. 3, at block 318, the media asset candidate controller 220 classifies the uncredited media asset that does not overlap with a streaming period as a non-candidate for qualification and disregards the uncredited media asset. At block 320, the media asset candidate controller 220 classifies the uncredited media asset that overlaps with a streaming period as a candidate for qualification. For example, when a media asset is uncredited and overlaps with a streaming period, there is a high probability that the meter that generated the media asset was exposed to some streaming content that is not yet included in the secondary media reference database 228. Accordingly, by only classifying those media assets that are uncredited and overlap with a streaming period, the media asset candidate controller 220 intelligently determines only the durations with high probability of media of interest (e.g., SVOD) exposure.

At block 322, the media asset candidate controller 220 determines whether there are additional uncredited media assets. In response to the media asset candidate controller 220 determining that there are no additional uncredited media assets (block 322: NO), the media asset candidate controller 220 transmits the uncredited media assets that were generated during periods of streaming to the media asset manager 222 for qualification against candidates from other meter files and media assets from the supplemental media asset source 224. Additionally, in response to the media asset candidate controller 220 determining that there are no additional uncredited media assets (block 322: NO), the machine-readable instructions 300 proceed to block 324. In response to the media asset candidate controller 220 determining that there are additional uncredited media assets (block 322: YES), the machine-readable instructions 300 proceed to block 326.

In the illustrated example of FIG. 3, at block 324, the media asset manager 222 qualifies the one or more candidate media assets classified by the media asset candidate controller 220. At block 326, if there are remaining uncredited media assets, the media asset candidate controller 220 selects the next uncredited media asset. After block 326, the machine-readable instructions 300 return to block 316. At block 328, the network interface 202 determines whether to continue monitoring one or more media devices.

In the illustrated example of FIG. 3, in response to the network interface 202 determining to continue monitoring the one or more media devices (block 328: YES), the machine-readable instructions 300 return to block 302. In response to the network interface 202 determining not to continue monitoring the one or more media devices (block 328: NO), the machine-readable instructions 300 terminate. For example, the network interface 202 may determine not to continue monitoring the one or more media devices if the one or more media devices are not presenting media, are not powered on, etc.

FIG. 4 is a flowchart representative of example machine-readable instructions 306 which may be executed to implement the central facility 112 of FIGS. 1 and 2 to credit one or more streaming periods to one or more registered devices. The machine-readable instructions 306 begin at block 402 where the streaming source creditor 208, and/or more generally, the streaming creditor 204, selects a first one of the streaming periods determined at block 304. At block 404, the streaming source creditor 208, and/or, more generally, the streaming creditor 204 determines the identity of the media source streaming media to a device (e.g., the streaming media source) during the streaming period.

In the illustrated example of FIG. 4, at block 406, the streaming device creditor 210, and/or, more generally, the streaming creditor 204, determines whether a MAC address of a device that accessed media during the selected streaming period matches a MAC address of a registered device. In response to the streaming device creditor 210 determining that the MAC address of the device that accessed media during the selected streaming period matches a MAC address of a registered device (block 406: YES), the machine-readable instructions 306 proceed to block 408. In response to the streaming device creditor 210 determining that the MAC address of the device that accessed media during the selected streaming period does not match a MAC address of a registered device (block 406: NO), the machine-readable instructions 306 proceed to block 410.

In the illustrated example of FIG. 4, at block 408, the streaming device creditor 210, and/or, more generally, the streaming creditor 204, credits the selected streaming period to the registered device that matches the MAC address of the device that accessed media during the selected streaming period. At block 410, the streaming source creditor 208, and/or, more generally, the streaming creditor 204, determines whether there is an additional streaming period. In response to the streaming source creditor 208 determining that there is an additional streaming period (block 410: YES), the machine-readable instructions 306 proceed to block 412. At block 412, the streaming source creditor 208, and/or, more generally, the streaming creditor 204, selects the next streaming period. In response to the streaming source creditor 208 determining that there is not an additional streaming period (block 410: NO), the machine-readable instructions 306 return to the machine-readable instructions 300 at block 308.

FIG. 5 is a flowchart representative of example machine-readable instructions 308 which may be executed to implement the central facility 112 of FIGS. 1 and 2 to credit one or more media assets to linear media and/or non-linear media. The machine-readable instructions 308 begin at block 502 where the preliminary media identification controller 212, and/or, more generally, the media creditor 206, selects a first media asset. At block 504, the preliminary media identification controller 212, and/or, more generally, the media creditor 206, determines whether the selected media asset is associated with a media identifier.

In the illustrated example of FIG. 5, in response to the preliminary media identification controller 212 determining that the selected media asset is associated with a media identifier (block 504: YES), the machine-readable instructions 308 proceed to block 506. At block 506, the preliminary media identification controller 212, and/or, more generally, the media creditor 206, identifies the media from which the selected media asset was generated based on the media identifier. At block 508, the change-line creditor 214, and/or, more generally, the media creditor 206, credits the first media asset to the identified media.

In the illustrated example of FIG. 5, in response to the preliminary media identification controller 212 determining that the selected media asset is not associated with a media identifier (block 504: NO), the machine-readable instructions 308 proceed to block 510. At block 510, the preliminary media identification controller 212, and/or, more generally, the media creditor 206, determines whether a monitored signature of the selected media asset matches a reference signature in the preliminary media reference database 226 maintained by the central facility 112. In response to the preliminary media identification controller 212 determining that the monitored signature of the selected media asset matches a reference signature in the preliminary media reference database 226 (block 510: YES), the machine-readable instructions 308 proceed to block 512.

In the illustrated example of FIG. 5, at block 512, the preliminary media identification controller 212, and/or, more generally, the media creditor 206, identifies the media from which the monitored signature of the selected media asset was generated based on the reference signature. After block 512, the machine-readable instructions 308 proceed to block 508 where the change-line creditor 214, and/or, more generally, the media creditor 206, credits the media asset to the identified media. In response to the preliminary media identification controller 212 determining that the monitored signature of the selected media asset does not match a reference signature in the preliminary media reference database 226 (block 510: NO), the machine-readable instructions 308 proceed to block 514.

In the illustrated example of FIG. 5, at block 514, in response to the preliminary media identification controller 212 determining that the monitored signature of the selected media asset does not match a reference signature in the preliminary media reference database 226, the secondary media identification controller 216, and/or, more generally, the media creditor 206, determines whether the monitored signature of the selected media asset matches a reference signature in the secondary media reference database 228. In response to the secondary media identification controller 216 determining that the monitored signature of the selected media asset does not match a reference signature in the secondary media reference database 228 (block 514: NO), the machine-readable instructions 308 proceed to block 518.

In the illustrated example of FIG. 5, in response to the secondary media identification controller 216 determining that the monitored signature of the selected media asset does match a reference signature in the secondary media reference database 228 (block 514: YES), the machine-readable instructions 308 proceed to block 516. At block 516, the secondary media identification controller 216 credits the selected media asset to media associated with the reference signature. At block 518, the preliminary media identification controller 212, and/or, more generally, the media creditor 206, determines whether there is an additional media asset.

In the illustrated example of FIG. 5, in response to the preliminary media identification controller 212 determining that there is an additional media asset (block 518: YES), the machine-readable instructions 308 proceed to block 520. At block 520, the preliminary media identification controller 212, and/or, more generally, the media creditor 206, selects the next media asset. After block 520, the machine-readable instructions 308 return to block 504. In response to the preliminary media identification controller 212 determining that there is not an additional media asset (block 518: NO), the machine-readable instructions 308 return to the machine-readable instructions 300 at block 310.

Figure 6:
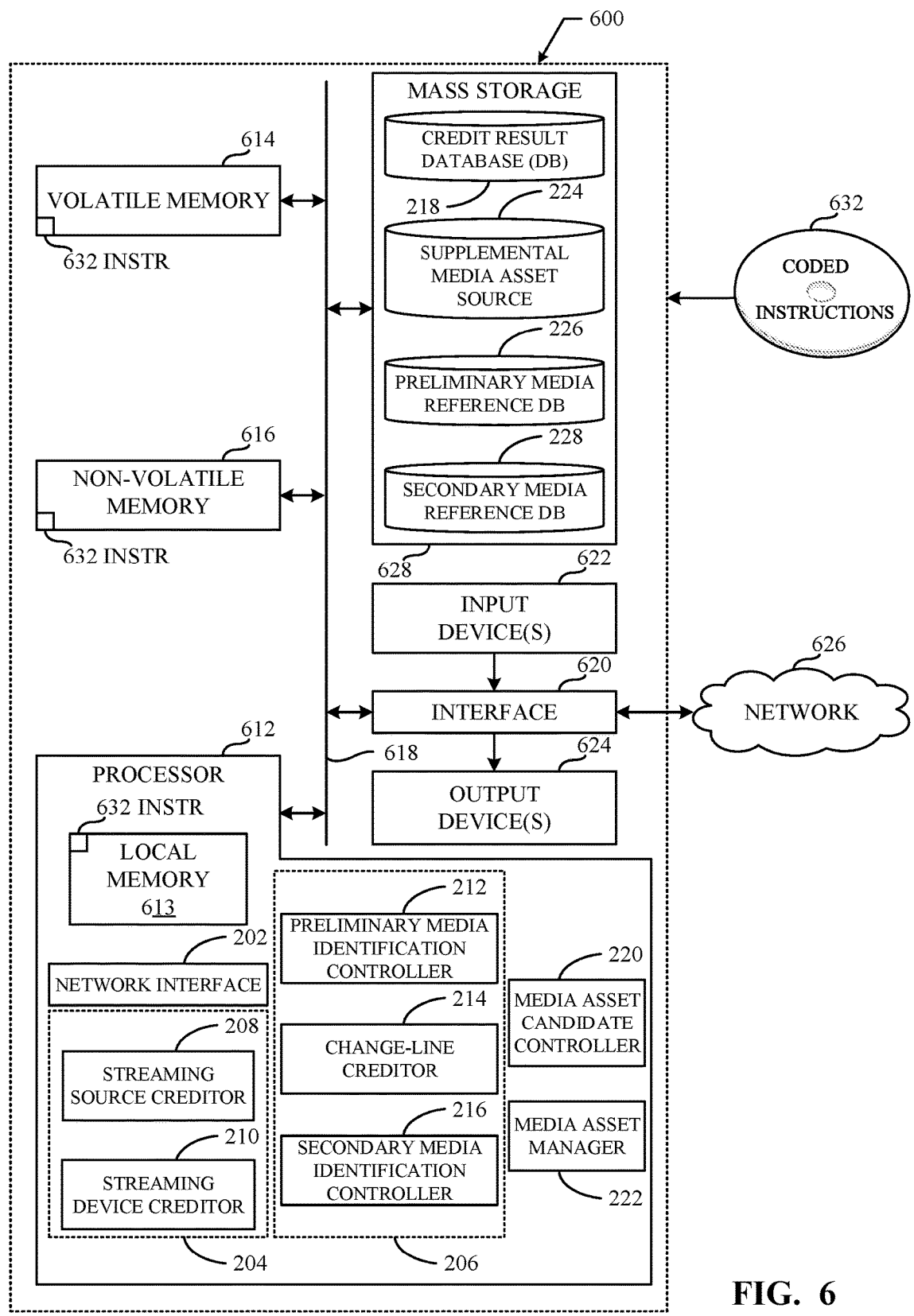
FIG. 6 is a block diagram of an example processing platform structured to execute the instructions of FIGS. 3, 4, and 5 to implement the central facility of FIGS. 1 and 2.

FIG. 6 is a block diagram of an example processor platform 600 structured to execute the instructions of FIGS. 3, 4, and 5 to implement the central facility 112 of FIGS. 1 and 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor 612 may be a semiconductor based (e.g., silicon based) device. In this example, the processor 612 implements the example network interface 202, the example streaming creditor 204, the example media creditor 206, the example streaming source creditor 208, the example streaming device creditor 210, the example preliminary media identification controller 212, the example change-line creditor 214, the example secondary media identification controller 216, the example media asset candidate controller 220, and the example media asset manager 222.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In the example of FIG. 6, the mass storage devices 628 implement the example credit result database 218, the example supplemental media asset source 224, the preliminary media reference database 226, and the example secondary media reference database 228.

The machine executable instructions 632 of FIG. 6 may be stored in the mass storage device 628, in the volatile memory 614, in the non-volatile memory 616, and/or on a removable non-transitory computer readable storage medium such as a CD or DVD. In the example of FIG. 6, the machine executable instructions 632 implement the machine-readable instructions 300 of FIGS. 3, 4, and 5.

Figure 7:
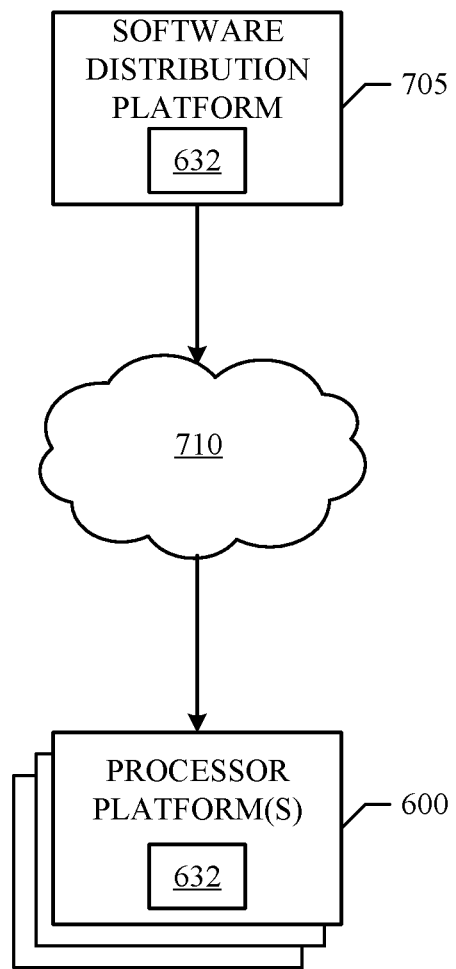
FIG. 7 is a block diagram of an example software distribution platform to distribute software (e.g., software corresponding to the example computer readable instructions of FIGS. 3, 4, and/or 5) to client devices such as those owned and/or operated by consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 705 to distribute software such as the example computer readable instructions 632 of FIG. 6 to devices owned and/or operated by third parties is illustrated in FIG. 7. The example software distribution platform 705 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 632 of FIG. 6. The third parties may be consumers, users, retailers, OEMs, etc., who purchase and/or license the software for use and/or re-sale and/or sub-licensing. In the illustrated example, the software distribution platform 705 includes one or more servers and one or more storage devices. The storage devices store the computer readable instructions 632, which may correspond to the example computer readable instructions 300 of FIGS. 3, 4, and/or 5, as described above. The one or more servers of the example software distribution platform 705 are in communication with a network 710, which may correspond to any one or more of the Internet and/or any of the example network 116 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 632 from the software distribution platform 705. For example, the software, which may correspond to the example computer readable instructions 632 of FIG. 6, may be downloaded to the example processor platform 600, which is to execute the computer readable instructions 632 to implement the central facility 112 of FIGS. 1 and/or 2. In some example, one or more servers of the software distribution platform 705 periodically offer, transmit, and/or force updates to the software (e.g., the example computer readable instructions 632 of FIG. 6) to ensure improvements, patches, updates, etc. are distributed and applied to the software at the end user devices.

From the foregoing, it will be appreciated that example methods, apparatus, and articles of manufacture have been disclosed for continual asset qualification to enhance a media reference database and non-linear media measurement. By filtering out media assets that have been credited to linear and/or non-linear media and/or media assets that do not overlap with streaming periods, the example methods, apparatus, and articles of manufacture disclosed herein reduce the computational burden associated with forming a media reference database. For example, the disclosed methods, apparatus, and articles of manufacture improve the efficiency of using a computing device by reducing the overall processing cycles consumed to qualify media assets, the bandwidth consumed to transmit media assets between components of the central facility, and the energy consumed to qualify media assets. The disclosed methods, apparatus, and articles of manufacture are accordingly directed to one or more improvement(s) in the functioning of a computer.

Example methods, apparatus, systems, and articles of manufacture to identify candidates for media asset qualification are disclosed herein. Further examples and combinations thereof include the following:

Example 1 includes an apparatus comprising a media creditor to determine whether to credit a first media asset to linear media or non-linear media, the non-linear media including subscription video on demand (SVOD), and a media asset candidate controller to classify the first media asset as a non-candidate for media asset qualification in response to the first media asset being credited to the linear media or the non-linear media, and determine whether to classify the first media asset as a candidate for media asset qualification based on whether the first media asset remains uncredited by the media creditor and the first media asset overlaps a streaming period.

Example 2 includes the apparatus of example 1, wherein the media asset candidate controller is to classify the first media asset as the candidate for media asset qualification in response to the first media asset remaining uncredited by the media creditor and the first media asset overlapping with the streaming period.

Example 3 includes the apparatus of example 2, further including a streaming creditor to determine the streaming period based on streaming information reported by a meter.

Example 4 includes the apparatus of example 3, wherein the streaming creditor is to credit the streaming period to a device registered with an audience measurement entity.

Example 5 includes the apparatus of example 1, wherein the media asset candidate controller is to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

Example 6 includes the apparatus of example 1, further including a reference database including a reference media asset, and wherein the media creditor is to determine whether the first media asset matches the reference media asset to determine whether to credit the first media asset to the linear media or the non-linear media.

Example 7 includes the apparatus of example 1, wherein the first media asset includes a signature and media metadata.

Example 8 includes the apparatus of example 1, further including a streaming source creditor to determine an identity of a source of streamed media provided to a device during the streaming period, and a media asset manager to qualify the first media asset based on at least the identity of the source of the streamed media provided to the device during the streaming period.

Example 9 includes an apparatus comprising at least one memory, computer readable instructions, and at least one processor to execute the instructions to determine whether to credit a first media asset to linear media or non-linear media, the non-linear media including subscription video on demand (SVOD), classify the first media asset as a non-candidate for media asset qualification in response to the first media asset being credited to the linear media or the non-linear media, and determine whether to classify the first media asset as a candidate for media asset qualification based on whether the first media asset remains uncredited and the first media asset overlaps a streaming period.

Example 10 includes the apparatus of example 9, wherein the at least one processor is to classify the first media asset as the candidate for media asset qualification in response to the first media asset remaining uncredited and the first media asset overlapping with the streaming period.

Example 11 includes the apparatus of example 10, wherein the at least one processor is to determine the streaming period based on streaming information reported by a meter.

Example 12 includes the apparatus of example 11, wherein the at least one processor is to credit the streaming period to a device registered with an audience measurement entity.

Example 13 includes the apparatus of example 9, wherein the at least one processor is to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

Example 14 includes the apparatus of example 9, wherein the memory includes a reference media asset, and the at least one processor is to determine whether the first media asset matches the reference media asset to determine whether to credit the first media asset to the linear media or the non-linear media.

Example 15 includes the apparatus of example 9, wherein the first media asset includes a signature and media metadata.

Example 16 includes the apparatus of example 9, wherein the at least one processor is to determine an identity of a source of streamed media provided to a device during the streaming period, and qualify the first media asset based on at least the identity of the source of the streamed media provided to the device during the streaming period.

Example 17 includes a non-transitory computer readable medium comprising instructions which, when executed, cause at least one processor to at least determine whether to credit a first media asset to linear media or non-linear media, the non-linear media including subscription video on demand (SVOD), classify the first media asset as a non-candidate for media asset qualification in response to the first media asset being credited to the linear media or the non-linear media, and determine whether to classify the first media asset as a candidate for media asset qualification based on whether the first media asset remains uncredited and the first media asset overlaps a streaming period.

Example 18 includes the non-transitory computer readable medium of example 17, wherein the instructions are to cause the at least one processor to classify the first media asset as the candidate for media asset qualification in response to the first media asset remaining uncredited and the first media asset overlapping with the streaming period.

Example 19 includes the non-transitory computer readable medium of example 18, wherein the instructions are to cause the at least one processor to determine the streaming period based on streaming information reported by a meter.

Example 20 includes the non-transitory computer readable medium of example 19, wherein the instructions are to cause the at least one processor to credit the streaming period to a device registered with an audience measurement entity.

Example 21 includes the non-transitory computer readable medium of example 17, wherein the instructions are to cause the at least one processor to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

Example 22 includes the non-transitory computer readable medium of example 17, wherein the instructions are to cause the at least one processor to determine whether the first media asset matches a reference media asset to determine whether to credit the first media asset to the linear media or the non-linear media.

Example 23 includes the non-transitory computer readable medium of example 17, wherein the first media asset includes a signature and media metadata.

Example 24 includes the non-transitory computer readable medium of example 17, wherein the instructions are to cause the at least one processor to determine an identity of a source of streamed media provided to a device during the streaming period, and qualify the first media asset based on at least the identity of the source of the streamed media provided to the device during the streaming period.

Example 25 includes an apparatus comprising means for crediting media, the means for crediting media to determine whether to credit a first media asset to linear media or non-linear media, the non-linear media including subscription video on demand (SVOD), and means for classifying media assets, the means for classifying media assets to classify the first media asset as a non-candidate for media asset qualification in response to the first media asset being credited to the linear media or the non-linear media, and determine whether to classify the first media asset as a candidate for media asset qualification based on whether the first media asset remains uncredited by the means for crediting media and the first media asset overlaps a streaming period.

Example 26 includes the apparatus of example 25, wherein the means for classifying media assets is to classify the first media asset as the candidate for media asset qualification in response to the first media asset remaining uncredited by the means for crediting media and the first media asset overlapping with the streaming period.

Example 27 includes the apparatus of example 26, further including means for crediting streaming, the means for crediting streaming to determine the streaming period based on streaming information reported by a meter.

Example 28 includes the apparatus of example 27, wherein the means for crediting streaming is to credit the streaming period to a device registered with an audience measurement entity.

Example 29 includes the apparatus of example 25, wherein the means for classifying media assets is to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

Example 30 includes the apparatus of example 25, further including a reference database including a reference media asset, and wherein the means for crediting media is to determine whether the first media asset matches the reference media asset to determine whether to credit the first media asset to the linear media or the non-linear media.

Example 31 includes the apparatus of example 25, wherein the first media asset includes a signature and media metadata.

Example 32 includes the apparatus of example 25, further including means for crediting streaming sources, the means for crediting streaming sources to determine an identity of a source of streamed media provided to a device during the streaming period, and means for qualifying media assets, the means for qualifying media assets to qualify the first media asset based on at least the identity of the source of the streamed media provided to the device during the streaming period.

Example 33 includes a method comprising determining whether to credit a first media asset to linear media or non-linear media, the non-linear media including subscription video on demand (SVOD), classifying the first media asset as a non-candidate for media asset qualification in response to the first media asset being credited to the linear media or the non-linear media, and determining whether to classify the first media asset as a candidate for media asset qualification based on whether the first media asset remains uncredited and the first media asset overlaps a streaming period.

Example 34 includes the method of example 33, further including classifying the first media asset as the candidate for media asset qualification in response to the first media asset remaining uncredited and the first media asset overlapping with the streaming period.

Example 35 includes the method of example 34, further including determining the streaming period based on streaming information reported by a meter.

Example 36 includes the method of example 35, further including crediting the streaming period to a device registered with an audience measurement entity.

Example 37 includes the method of example 33, further including, in response to at least two timestamps of the first media asset indicating that the first media asset covers times within a first threshold amount of time after a start timestamp of the streaming period and within a second threshold of time after an end timestamp of the streaming period, determining that the first media asset overlaps with the streaming period.

Example 38 includes the method of example 33, further including determining whether the first media asset matches a reference media asset to determine whether to credit the first media asset to the linear media or the non-linear media.

Example 39 includes the method of example 33, wherein the first media asset includes a signature and media metadata.

Example 40 includes the method of example 33, further including determining an identity of a source of streamed media provided to a device during the streaming period, and qualifying the first media asset based on at least the identity of the source of the streamed media provided to the device during the streaming period.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   programmable circuitry;
   media creditor instructions to cause the programmable circuitry to determine whether to credit a first media asset to linear media or non-linear media, the non-linear media including subscription video on demand (SVOD); and
   media asset candidate controller instructions to cause the programmable circuitry to:
      classify the first media asset as a non-candidate for media asset qualification in response to the first media asset being credited to the linear media or the non-linear media; and
      determine whether to classify the first media asset as a candidate for media asset qualification based on whether the first media asset remains uncredited by the media creditor instructions and the first media asset overlaps a streaming period.

2. The apparatus of claim 1, wherein the media asset candidate controller instructions are to cause the programmable circuitry to classify the first media asset as the candidate for media asset qualification in response to the first media asset remaining uncredited by the media creditor instructions and the first media asset overlapping with the streaming period.

3. The apparatus of claim 2, further including streaming creditor instructions to cause the programmable circuitry to determine the streaming period based on streaming information reported by a meter.

4. The apparatus of claim 3, wherein the streaming creditor instructions are to cause the programmable circuitry to credit the streaming period to a device registered with an audience measurement entity.

5. The apparatus of claim 1, wherein the media asset candidate controller instructions are to cause the programmable circuitry to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

6. The apparatus of claim 1, further including a reference database including a reference media asset, and wherein the media creditor instructions are to cause the programmable circuitry to determine whether the first media asset matches the reference media asset to determine whether to credit the first media asset to the linear media or the non-linear media.

7. The apparatus of claim 1, wherein the first media asset includes a signature and media metadata.

8. The apparatus of claim 1, further including:
   streaming source creditor instructions to cause the programmable circuitry to determine an identity of a source of streamed media provided to a device during the streaming period; and
   media asset manager instructions to cause the programmable circuitry to qualify the first media asset based on at least the identity of the source of the streamed media provided to the device during the streaming period.

9. An apparatus comprising:
   at least one memory;
   computer readable instructions; and
   at least one processor to execute the instructions to:
      determine whether to credit a first media asset to linear media or non-linear media, the non-linear media including subscription video on demand (SVOD);
      classify the first media asset as a non-candidate for media asset qualification in response to the first media asset being credited to the linear media or the non-linear media; and
      determine whether to classify the first media asset as a candidate for media asset qualification based on whether the first media asset remains uncredited and the first media asset overlaps a streaming period.

10. The apparatus of claim 9, wherein the at least one processor is to classify the first media asset as the candidate for media asset qualification in response to the first media asset remaining uncredited and the first media asset overlapping with the streaming period.

11. The apparatus of claim 10, wherein the at least one processor is to determine the streaming period based on streaming information reported by a meter.

12. The apparatus of claim 11, wherein the at least one processor is to credit the streaming period to a device registered with an audience measurement entity.

13. The apparatus of claim 9, wherein the at least one processor is to, in response to at least two timestamps of the first media asset indicating that the first media asset covers times within a first threshold amount of time after a start timestamp of the streaming period and within a second threshold of time after an end timestamp of the streaming period, determine that the first media asset overlaps with the streaming period.

14. The apparatus of claim 9, wherein:
   the memory includes a reference media asset; and
   the at least one processor is to determine whether the first media asset matches the reference media asset to determine whether to credit the first media asset to the linear media or the non-linear media.

15. The apparatus of claim 9, wherein the first media asset includes a signature and media metadata.

16. The apparatus of claim 9, wherein the at least one processor is to:
   determine an identity of a source of streamed media provided to a device during the streaming period; and
   qualify the first media asset based on at least the identity of the source of the streamed media provided to the device during the streaming period.

17. A non-transitory computer readable medium comprising instructions which, when executed, cause at least one processor to at least:
   determine whether to credit a first media asset to linear media or non-linear media, the non-linear media including subscription video on demand (SVOD);
   classify the first media asset as a non-candidate for media asset qualification in response to the first media asset being credited to the linear media or the non-linear media; and
   determine whether to classify the first media asset as a candidate for media asset qualification based on whether the first media asset remains uncredited and the first media asset overlaps a streaming period.

18. The non-transitory computer readable medium of claim 17, wherein the instructions are to cause the at least one processor to classify the first media asset as the candidate for media asset qualification in response to the first media asset remaining uncredited and the first media asset overlapping with the streaming period.

19. The non-transitory computer readable medium of claim 18, wherein the instructions are to cause the at least one processor to determine the streaming period based on streaming information reported by a meter.

20. The non-transitory computer readable medium of claim 19, wherein the instructions are to cause the at least one processor to credit the streaming period to a device registered with an audience measurement entity.

* * * * *